United States Patent [19]
Thompson et al.

[11] Patent Number: 5,976,486
[45] Date of Patent: Nov. 2, 1999

[54] METHOD FOR CATALYTIC PRODUCTION OF HYDROGEN PEROXIDE AND CATALYST THEREFOR

[75] Inventors: Mark E. Thompson; Venkatesan V. Krishnan; Alexandre G. Dokoutchaev; Feras Abdel-Razzaq; Shannon C. Rice, all of Los Angeles, Calif.

[73] Assignee: University of Southern California, Los Angeles, Calif.

[21] Appl. No.: 09/049,612

[22] Filed: Mar. 27, 1998

[51] Int. Cl.[6] .............................. B01J 31/18; C01B 15/01
[52] U.S. Cl. ............................... 423/584; 502/162
[58] Field of Search ............................... 423/584; 502/162

[56] References Cited

U.S. PATENT DOCUMENTS

| | | | |
|---|---|---|---|
| 4,389,390 | 6/1983 | Dalton, Jr. et al. | 423/584 |
| 5,480,629 | 1/1996 | Thompson et al. | 423/584 |

*Primary Examiner*—Wayne Langel
*Attorney, Agent, or Firm*—Oppenheimer, Wolff & Donnelly

[57] ABSTRACT

A method for the production of hydrogen peroxide from a source of hydrogen and oxygen in the presence of a dispersion of a catalyst in an organic reaction medium, the catalyst being composed of inert particles of between 1 and 100 microns, the particles having coated thereon about three to ten layers of a zirconium or hafnium complex, the organic reaction medium having a pH of less than about 3 and composed of at least 50% of a lower alkyl alcohol, a lower alkyl ketone or a mixture thereof, water and a mineral acid.

13 Claims, 14 Drawing Sheets

1. 3 LAYERS OF ANQ (FASilPdANQ3)
2. 1 LAYER OF NAP DERIVATIVE, 2 LAYERS OF ANQ (FASilPdNAP1ANQ2)
3. 1 LAYER OF PV, 2 LAYERS OF ANQ (FASilPdPV1ANQ2)

METHOD FOR CATALYTIC PRODUCTION OF HYDROGEN PEROXIDE AND CATALYST THEREFOR

FIELD OF THE INVENTION

This invention relates to an improved process for producing hydrogen peroxide from hydrogen and oxygen in the presence of a Group VIII metal catalyst such as palladium, platinum or nickel and an improved catalyst for such production.

BACKGROUND OF THE INVENTION

For the most part, in the past, the synthesis of hydrogen peroxide was accomplished by the hydrogenation of anthraquinone to form the corresponding hydroquinone and the subsequent oxidation of the hydroquinone to obtain hydrogen peroxide. The catalyst initially used to accomplish this reaction was Raney nickel which has only recently been replaced by a supported palladium catalyst. Although this process has been used since the 1940's through several modifications, it nevertheless is very capital intensive in terms of downstream separation process costs.

Among recent developments in the direct synthesis of hydrogen peroxide from hydrogen and oxygen, there may be mentioned Gosser et al. (U.S. Pat. No. 5,135,731) and Chuang et al. (U.S. Pat. No. 5,338,531) who have used palladium supported on silica and carbon, respectively, to carry out the reaction. In addition, U.S. Pat. No. 3,336,112 discloses a process for the direct production of hydrogen peroxide by contacting a mixture of gases containing oxygen hydrogen with a solid catalyst having a Group VIII metal included therein. U.S. Pat. No. 4,009,252 also discloses the same reaction utilizing a Group VIII metal catalyst.

One of the problems in using Group VIII metals, such as platinum and palladium, to catalyze the reaction of hydrogen and oxygen to form hydrogen peroxide is that these very same metals catalyze the reaction of hydrogen peroxide with hydrogen to produce water.

There have been many attempts to promote the reaction of hydrogen and oxygen to peroxide and to retard the reaction of hydrogen and hydrogen peroxide to produce water. One of the ways to increase the yield of hydrogen peroxide when using a Group VII metal catalyst is to conduct the reaction in the presence of halides. There is evidence that the presence of chloride and bromide ions have an important influence in promoting the Group VII metal-based catalytic scheme for producing hydrogen peroxide. The mechanism by which the halide ions promote the production of hydrogen peroxide is not clear but regardless of the mechanism, there are great concerns about using halides in such a reaction because of the extreme corrosive nature of halides when they are in solution.

U.S. Pat. No. 5,480,629 also uses Group VIII metals to catalyze the reaction of hydrogen and oxygen to peroxide by forming pillars of alkyl bisphosphonic acids with dicationic bipyridinium (viologen) groups incorporated into the alkyl chain. Within the pillars are Group VII metals which are dispersed throughout the organic compounds. This patent thus discloses a heterogeneous catalyst wherein an organic catalyst is a source of reducing potential to generate hydrogen peroxide from oxygen. The colloidal particles of Group VIII metals (e.g. platinum and/or palladium) act as catalysts for the preliminary step of removal of the electron from the hydrogen absorbed on the metal. The electrons released from this preliminary step reduce the viologen in the pore structure to give a radical cation. The radical cation will react with the dissolved oxygen and the hydrogen to form hydrogen peroxide.

In all of the processes described above, the decomposition reaction of hydrogen peroxide is enhanced the higher the peroxide levels.

SUMMARY OF THE INVENTION

The present invention is based on the use of Group VIII metals to catalyze the reaction of hydrogen and oxygen to hydrogen peroxide without the dependence on halides such as chlorine or bromine. As is known in the art, halides are very corrosive and special high-grade alloys are necessary for peroxide production under such environment. Thus, the present invention provides for the production of hydrogen peroxide by contacting a dispersion of a Group VIII metal in an aqueous liquid (organic reaction medium) with a source of hydrogen and oxygen. We have found that the aqueous liquid must contain at least about 50 percent by volume of an organic liquid which may be a lower alkyl alcohol, a lower alkyl ketone or a mixture of the two. In addition, the aqueous liquid medium must contain a mineral acid in an amount sufficient to produce a pH of less than about 3 and, ideally, less than about 2.

It is currently believed that the kind of mineral acid is not particularly critical and we have found that useful mineral acids in the present invention are, inter alia, sulfuric acid, hydrochloric acid and nitric acid. In all instances, these acids should be added to the alcohol or ketone after having been diluted with water.

Lower alkyl alcohols which may be used in the present invention include ethanol, methanol, isopropanol and n-butanol. Lower alkyl ketones which are useful in the present invention include acetone, methylethylketone, methylpropylketone and diethylketone.

As has been noted previously, the amount of organic compound (i.e. lower alkyl alcohol, lower alkyl ketone or mixture of the two) in the organic reaction medium must be at least about 50 volume percent. However, it is preferred if the amount of organic compound is from about 60 volume percent to as high as about 80 volume percent.

All of the Group VIII catalysts mentioned in the patents described above are useful in the process of the present invention since the organic reaction medium increases the yield of hydrogen peroxide regardless of the particular type or form of the Group VIII metal utilized as a catalyst.

Among the preferred catalyst useful in the present invention are those disclosed in U.S. Pat. No. 5,480,629; the entire content of this patent, including the claims, are hereby incorporated herein by reference.

A particularly preferred catalyst useful in the process of the present invention are those descripted in U.S. Pat. No. 5,480,629 (incorporated herein by reference) which are highly porous. They are formed by attaching a Group VIII metal to a substrate and the attaching to the Group VIII metal a complex having the formula:

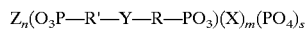

$$Z_n(O_3P\text{—}R'\text{—}Y\text{—}R\text{—}PO_3)(X)_m(PO_4)_s$$

wherein Z is zirconium or hafnium R and R' are lower alkyl, X is a halide (e.g. chlorine or bromine), Y is an aromatic ring system which may have one or more tetravalent nitrogen atoms or may have oxygen atoms such as quinone or anthraquinone, n is from 1 to 3, m is from 1 to 10 and s is 0 to 1.

In one embodiment, each tetravalentnitrogen atom is a ring member in a separate aromatic ring system and two such ring systems, which can be of the same or different structure, are joined to one another directly through a covalent bond. Each such aromatic ring system can be a monocycle such as pyridine, pyrazine, or pyrimidine. Alternatively, each aromatic ring system can be a fused polycycle in which a pyridine, pyrazine, or pyrimidine ring is fused to one or more benzo or naphtho ring system, as for example quinolinium, isoquninolinium, phenanthridine, acridine, benz[h] isoquinoline, and the like.

The two aromatic ring systems, which can be of the same or different structure, alternatively can be linked through a divalent conjugated system as for example diazo (—N=N—), imino (—CH=N—), vinylene, buta-1,3-diene-1,4-diyl, phenylene, biphenylene, and the like.

In a further embodiment, the two conjugated cationic centers can be in a single aromatic system such as phynanthroline, 1,10-diazaanthrene, and phenazine.

Typical dicationic structures suitable as Y thus include 2,2-bipyridinium, 3,3-bipyridinium, 4,4-bipyridinium, 2,2-bipyrazinium, 4,4-biquinolinium, 4,4-biisoquninolinium, 4-[2-4-pyridinium)vinyl]pyridinium, and 4-[4-(4-pyridinium)phenyl]pyridinium.

Other organic moieties include anthraquinone and napthaquinone as well as other moities disclosed in U.S. Pat. No. 2,369,912; U.S. Pat. No. 2,673,140; British Patent 686,657 and Goor, G. in "Catalytic Oxidation With $H_2O_2$ as Oxidant", (G. Strukel, Ed.P, Chap. 2. Kluwer Academic, Norwell, Mass., 1992, which patents and publications are incorporated, in their entirety, herein by reference.

The novel catalysts of the present invention (which are also very useful in the process of the present invention) are not highly porous. In fact such catalysts are only porous to hydrogen so that only hydrogen will contact the Group VIII metal; oxygen and hydrogen peroxide cannot contact the Group VIII metal. When the hydrogen contacts the Group VIII metal, an electron and a proton is produced and the electron diffuses through the layers of inorganic complex.

The novel catalysts of the present invention has inert particles (e.g. silica, polystyrene beads, etc.) which are from about 1 to about 100 microns in size (preferably from about 1 to 20 microns in size) and which have coated on the surface thereof a Group VIII metal such as platinum, palladium, nickel and mixtures thereof. On top of the Group VIII metal is coated from about three to about ten layers of a complex having the formula:

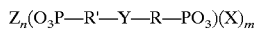

in which Z, R', Y, R, X, n and m have the same meaning as indicated before.

It should be noted that the novel catalysts of the present invention are set forth in the Detailed Description of the Invention and are those catalysts starting with "FAS".

DETAILED DESCRIPTION OF THE INVENTION

Figure 1:
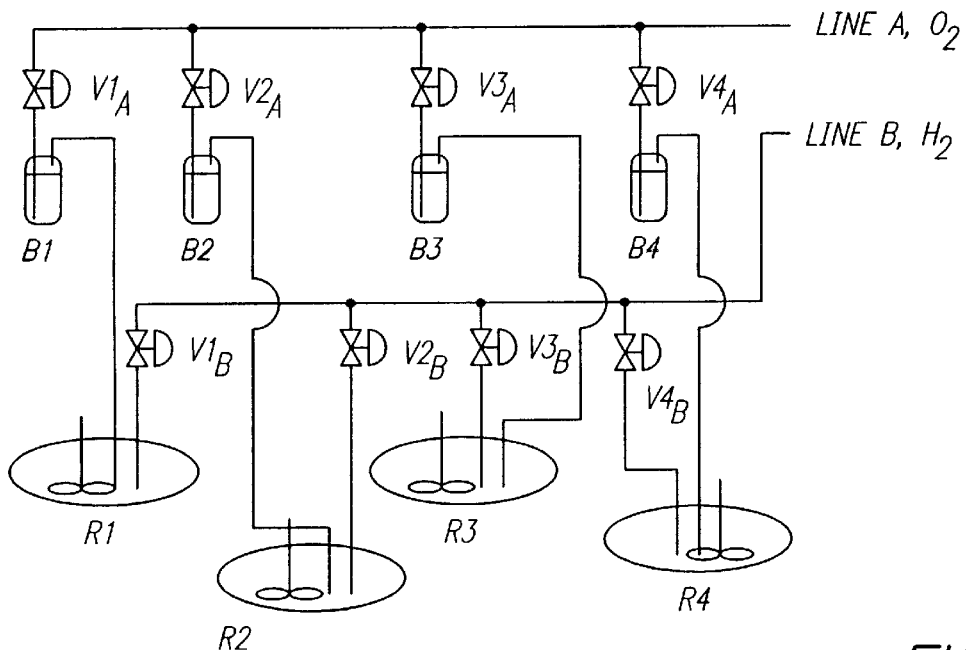
FIG. 1 is a schematic of the flow system.

Synthesis of Catalysts a. Sypported lavers of zirconium phosphate phosphonate:

SCRI124: Preparation of the dense Pd/Pt supported catalyst 3.0 g untreated silica was placed into a jacketed column. Approximately 115 mL of freshly prepared 80 mM aqueous $ZrOCl_2 \cdot 8 H_2O$ was added to the fritted column. The slurry was mixed by vigorously sparging with argon through the fritted glass. After several hours at ambient temperature, the salt solution was removed and the silica washed with several portions of water. To the column was then added 120 mL of a 10 mM viologen phosphonate/60 mM NaCl solution. The slurry was again mixed by vigorous argon sparging and the column was heated to 60° C. for 5–6 hours. The viologen solution was removed and the silica washed with several portions of water. The zirconium and phosphonate layering steps were repeated for a total of 3 layers of each species. After the final viologen layer, approximately 100 mL of a 2.19 mM $K_2PtCl_4$/19.3 mM $Na_2PdCl_4$ (1:8.79 Pt/Pd) solution was added to the column and the solution was mixed at room temperature overnight. After several water washings, the coated silica was suspended in 100 mL water and heated to 60° C. Hydrogen gas was sparged through the solution for 2 hours immediately changing the silica from orange to black. The water was removed and the silica washed with ethanol and dried in vacuum.

SCRI130b: Preparation of the porous Pd/Pt supported catalyst 3.0 g untreated silica was placed into a jacketed column. Approximately 115 mL of freshly prepared 65 mM aqueous $ZrOCl_2 \cdot 8 H_2O$ was added to the fritted column. The slurry was mixed by vigorously sparging with argon through the fritted glass. After several hours at ambient temperature, the salt solution was removed and the silica washed with several portions of water. To the column was then added 120 mL of a 20 mM viologen phosphonate/4 mM $H_3PO_4$ solution. The slurry was again mixed by vigorous argon sparge and the column was heated to 60° C. for 5–6 hours. The viologen solution was removed and the silica washed with several portions of water. The zirconium and phosphonate layering steps were repeated for a total of 2 layers of each species. After the final viologen layer, approximately 100 mL of a 1.75 mM $K_2PtCl_4$/15.8 mM $Na_2PdCl_4$ (1:9.03 Pt/Pd) solution was added to the column and the solution was mixed at room temperature overnight. After several water washings, the coated silica was suspended in 100 mL water and heated to 60° C. Hydrogen gas was sparged through the solution for 2 hours immediately changing the silica from orange to black. The water was removed and the silica washed with several portions of water. Onto the metallated silica was grown alternating layers of zirconium and viologen phosphonate/phosphate using the procedure mentioned previously (3 more layers zirconium and two more layers viologen/phosphate). The final zirconium layer was capped by treating the silica with a 90 mM solution of ethylphosphonic acid at 60° C. The silica was washed with water and ethanol and dried in vacuo.

b. Bulk phase zirconium phosphate phosphonate and hafnium phosphate phosphonate by reflux and hydrothermal methods:

The syntheses of zirconium phosphate viologen-phosphonates both by reflux and hydrothermal methods have been described in previous literature. The syntheses used here are similar to the published ones, and are described below.

Reflux synthesis: A round bottomed flask was charged with 25 mL of water, 1.12 mmol of $ZrOCl_2.8H_2O$, and 4.72 mmol of HF (50%). A solution containing 0.56 mmol of viologen-phosphonate ($H_2O_3PCH_2CH_2$-4,4'-bipyridinium-$CH_2CH_2PO_3H_3Cl_2$, PV.$Cl_2$) and 1.12 mmol of 85% orthophosphoric acid dissolved in 25 mL of water was added slowly, and the resulting suspension heated to reflux for 7 days. The suspension was then filtered and washed with water, ethanol and acetone and then air dried.

Hydrothermal synthesis: A teflon lined bomb (PARR, 4744 General Purpose) with a volume of 45 mL was used for the hydrothermal synthesis. Reactant mixture A was prepared by dissolving either 2.28 mmol of $HfOCl_2.8H_2O$ or 2.28 mmol of $ZrOCl_2.8H_2O$ along with 0.073 mL (2.28 mmol) of 50% HF (stoichiometric amount) or 0.365 mL (5 times the stoichiometric amount) or 0.73 mL (10 times the stoichiometric amount), in 17 mL of water. Reactant mixture A was prepared directly in the bomb. Reactant mixture B contained 0.507 g (1.14 mmol) of PV.$Cl_2$ and 0.078 mL (1.14 mmol) of 85% $H_3PO_4$, along with 17 mL of water. Reactant mixture B was added slowly to A in the bomb. A small quantity of precipitate formed and the bomb was sealed and placed in an oven kept at 195° C. for a period of 5 days. The optimal crystallization time and temperature of the hydrothermal crystal growth were determined by trial and error.

Ion-exchange: Zirconium phosphate PV (hereinafter MPOPV) was synthesized by either reflux or hydrothermal methods, and ion-exchange of $PdCl_4^{2-}$ and $PtCl_4^{2-}$ was carried out in a round bottomed flask, by using excess of the salt solution with the Pd/Pt ratio adjusted to give different metal ratios in the final material. Solutions of $K_2PtCl_4$ or $Na_2PdCl_4$ or both (100 ml) were added to about 100 mg of MPOPV and the suspension was stirred for 3 days at a temperature of 60–65° C.

Reduction: Reduction was carried out by bubbling hydrogen through an aqueous suspension of the ion-exchanged material at about 45–50° C., although the reduced metal forms even at room temperature.

c. Zirconium phosphate phosphonate layers grown on Pt/PdNi-metal supported on functionalized silica $EtOSiHMe_2$—Modified Silica Particles Si—DMES.

To a suspension of silica particles in acetone (1 g of silica/200 mL acetone) was added dimethylethoxysilane (2.20 mL, 16 mmol). The mixture was stirred under reflux for 36 h. The Si—DMES was cleaned of unreacted silanating agent using five centrifugation/redispersion cycles in acetone. FTIR (DRIFTS) was used to verify the presence of the Si—H frequency, $\upsilon$ at 2137 $cm^{-1}$. The disappearance of this peak in the FTIR spectrum (Si—OH) was noted prior to carrying out the modification with DMES.

Modification of Si—DMES Particles with Platinum nanoparticles Si—DMES—Pt.

To a suspension of Si—DMES (0.1 g) dispersed in THF (10 mL) was added Karstedt's Pt catalyst[15] (5 mL of 3% solution Platinum divinyltetramethylsiloxane complex in xylene) under an open atmosphere. The suspension was heated for 8 h at 60° C. The silica-supported platinum nanoparticles, Si—DMES—Pt, was cleaned with THF using five centrifugation / re-dispersion cycles.

Modification of Si—DMES—Pt with ZrPV(Cl) (FASiKPtPV2)

Pt-modified silica particles was initialized with (4-mercaptobutyl) phosphonic acid (5 mM solution in ethanol) overnight under nitrogen to produce a bisphosphonic acid rich surface. Si—DMES—PT—S$(CH_2)_4$PO$(OH)_2$, was cleaned with $H_2O$ using three centrifugation/redispersion cycles, the modified particles were ready for treatment in metal solution. ZrPV(Cl) films were grown on Si—DMES—PT—S$(CH_2)_4$PO$(OH)_2$ by alternate treatment in 10 mM viologen bisphosphonic acid solution at 60° C. for overnight and room temperature treatment in 100 mM $ZrOCl_2$ aqueous solution for 3 hrs. The particles were thoroughly cleaned with $H_2O$ using three centrifugation/redispersion cycles between treatments.

FASiIPdPV, FASiLPsANQ, FASiINiANQ

Modification of Silica Particles with Palladium Si—Pd.

To 0.25 g of silica particles was added a 0.75 mL aqueous solution of $Na_2PdCl_4$ (2% atom/molecule of Pd to $SiO_2$). The mixture was dried overnight at 110° C. Pd-salt-modified particles were calcined in air at 400° C. for 2 hours after which they were reduced at 400° C. using a stream of 5% $H_2$/95% $N_2$ (rate 100 ml/min) for 4 hours.

Modification of Silica Particles with Nickel Si—Ni.

To 0.25 g of silica particles was added a 0.75 mL aqueous solution of $NiCl_2$ (2% atom/molecule of Ni to $SiO_2$). The mixture were dried over night at 110ûC. Ni-salt-modified particles was calcified in air at 400° C. for 2 hours then it was reduced at 400° C. using a stream of 5% $H_2$/95% $N_2$ (rate 100 ml/min) for 4 hours.

Modification of functionalized Latex Particles with Palladium PS—Pd.

To a suspension of functionalized polystyrene particles (carboxylic acid or amine) in water (0.05 g of silica/5 ml $H_2O$) was added a solution of 0.2 M $Na_2PdCl_4$ in 0.01 M KOH aqueous solution). The suspension was stirred for 20 hours. PS—Pd, was cleaned with $H_2O$ using three centrifugation / re-dispersion cycles. The modified polystyrene particles were reduced by stirring in 10 mL of 0.01 M $N_2H_2$. The Pd-modified latex particles were cleaned with $H_2O$ using three centrifugation / re-dispersion cycles.

Modification of Si—Pd or PS—Pd with ZrPV(Cl) (FASiIPdPV3 or FAPSIPdPV3 respectively)

Pd-modified particles was initialized with 4-mercaptobutyl)phosphonic acid (5 mM solution in ethanol) over night under nitrogen to produce a phosphonic acid rich surface. Particles—Pd—S$(CH_2)4$PO$(OH)_2$ was cleaned with $H_2O$ using three centrifugation / re-dispersion cycles, the modified particles were ready for treatment in metal solution. ZrPV(Cl) films were grown on Particles—Pd—S(CH$_2$)$_4$PO(OH)$_2$ by alternate treatment in 10 mM viologen bisphosphonic acid solution at 60° C. for overnight and room temperature treatment in 100 mM ZrOCl$_2$ aqueous solution for three hours. The particles were thoroughly cleaned with H$_2$O using three centrifugation / re-dispersion cycles between treatments.

Modification of Si—Pd or PS—Pd with ZrANQ (FASiIPdANQ3 or FAPSIPdANQ3 respectively)

Pd-modified particles was initialized with (4-mercaptobutyl) phosphonic acid (5 mM solution in ethanol) overnight under nitrogen to produce a phosphonic acid rich surface. Particles—Pd—S(CH$_2$)$_4$PO(OH)$_2$, was cleaned with H$_2$O using three centrifugation / re-dispersion cycles, the modified particles were ready for treatment in metal solution. ZrANQ films were grown on Particles—Pd—S(CH$_2$)$_4$PO(OH)$_2$ by alternate treatment in 10 mM solution of dihydoxy-anthraquinone bisphosphonic acid derivative at 60° C. for overnight and room temperature treatment in 100 mM ZrOCl$_2$ aqueous solution for 3 hours. The ZrANQ-modified particles were thoroughly cleaned with H$_2$O using three centrifugation / redispersion cycles between treatments.

Modification of Si—Ni with ZrPV(Cl) or ZrANQ (FASiINiPV3 or FASiINiANQ3 respectively)

Ni-modified particles was initialized with 4-(mercaptobutyl) phosphonic acid (5 mM solution in ethanol) overnight under nitrogen to produce a phosphonic acid rich surface. Particles—Ni—S(CH$_2$)$_4$PO(OH)$_2$ were cleaned with H$_2$O using three centrifugation / re-dispersion cycles enabling the modified particles to be ready for treatment in metal solution. ZrPV(Cl) films were grown on the particles—Ni—S(CH$_2$)$_4$PO(OH)$_2$ by alternate treatment in 10 mM viologen bisphosphonic acid solution or at 60° C. for overnight and room temperature treatment in 100 mM ZrOCl$_2$ aqueous solution for 3 hours. ZrANQ films were grown on the particles—Ni—S(CH$_2$)$_4$PO(OH)$_2$ by alternate treatment in 10 mM solution of dihydoxyanthraquinone bisphosphonic acid derivative at 60° C. for overnight and room temperature treatment in 100 mM ZrOCl$_2$ aqueous solution for 3 hours. The particles were thoroughly cleaned with H$_2$O using three centrifugation / re-dispersion cycles between treatments.

Synthesis of (H$_2$O$_3$P—(CH$_2$)$_4$O—2,6-anthraquinone—O (CH$_2$)$_4$—PO$_3$H$_2$)

Synthesis of 2,6-Bis (4-phosphonobutyloxy)-anthraquinone (ANQ) (Formula: H$_2$O$_3$P—(CH$_2$)$_4$O—2,6-anthraquinone—O(CH$_2$)$_4$—PO$_3$H$_2$). 2,6-dihydroxyanthraquinone (1.19 g, 4.98 mmol) and diethyl(4-bromobutyl)phosphonate (3.0 g, 10 mmol) were heated at 60° C. in 5 ml DMF in the presence of 0.8 g of K$_2$CO$_3$ for 72 hours. The solution was extracted with CH$_2$Cl$_2$. The CH$_2$Cl$_2$ solution was dried, leaving a yellow solid. The ester was purified by column chromatography. The bisphosphonate ester was converted to the acid by overnight stirring with 4-fold excess of bromotrimethylsilane in dry dichloromethane followed by addition of water. The bisphosphonic acid derivative was washed with CH$_2$Cl$_2$, filtered and collected.

Composition of Catalysts: ICP-MS Analysis

Table 1 shows the various catalysts used for the kinetic experiments for hydrogen peroxide production and their elemental composition by ICP-MS. Note that the actual composition of the platinum and palladium in the catalyst is not in the same ratio, as the ion-exchange solution.

A very small quantity of the catalyst, about 5 mg was weighed and dissolved in 4–5 drops of HF, HCl and HNO$_3$. After complete dissolution, the sample was diluted with DI water, to about 50 ml to generate a sample solution containing all the necessary ions. This solution was diluted appropriately to ensure that the concentration of the ions was in the linear range. A set of calibration standards were prepared using ICP-standard solutions of ions such as Zr, Hf, Pd, Pt and P (purchased from Aldrich).

Nomenclature: The supported catalysts include SCRI124, SCRI130, FASiKPtPV2, FASiIPdPV3 and FASiIPdANQ3. The bulk phase porous catalysts, with Zr in certain cases and Hf in the other cases have been coded in the following manner—Zr or Hf, corresponding to whichever one was used in the hydrothermal synthesis. The number 2 or 3 or 19 or 20, indicates the batch number, that was grown. The 'h' or 'r' which follows the batch number, indicates 'hydrothermal' or 'reflux' mode of preparation (refer to the synthesis section). Following this is the letter 'i' that denotes 'ion-exchanged', which is followed by the molar percentage of Pt, i.e. Pt/(Pt+Pd) in the ion-exchanging solution. In cases, where Pt was not used in the solution for ion-exchange, we have used 'Pd' to denote 100% Pd in the ion-exchange solution. Once the catalyst is reduced, we add the letter 'r' in the end, as shown in Tables 2 and 3.

In case of the supported catalysts, the FA-series catalysts are classified in the following manner—FA, the initials of the person making the catalyst, Si or PS, denotes the substrate, whether it is silica or polystyrene, I or K following it, indicates the method of supporting the metal on substrate (I, impregnation and K, Karstedt catalyst method), Pt/Pd/Ni, obviously is the metal which is put on the substrate and finally, the acceptor layers (viologen bisphosphonate, PV or the anthraquinone, ANQ), followed by the number of such layers.

Performance Evaluation for Hydrogen Peroxide Production

Batch Kinetics

Reactor

The easiest laboratory reactor that can be used for carrying out the hydrogen peroxide production reaction is a batch system. Our reactor is more like a semi-batch system because the flow of hydrogen and oxygen is maintained in a slurry of the catalyst in the reaction medium. The reactor operates under atmospheric conditions thereby eliminating the accumulation of hydrogen in the gas phase. A schematic flow sheet of the reaction panel and the reactor is shown in FIG. 1. As may be seen, this system has the ability to direct gas flow to 4 reactors and therefore all 4 can be used simultaneously for investigation. An electronic mass flow meter (Omega Instruments) is used to measure the flow rates of the individual gases, prior to the start of the experiment.

An acetone bubbler has been installed, as shown in FIG. 1. Oxygen to the reactor is, thus, pre-saturated with acetone. This is necessary to prevent the rapid evaporation of acetone from the reactor during the reaction. Of course in case of water based media, a bubbler with water was used. In most test conditions, flow rates of O$_2$ were as high as 190–200 cc/min and H$_2$ as low as 15–20 cc/min. Individual flows of the 2 gases were maintained, instead of a pre-mixed feed of hydrogen and oxygen, owing to the higher solubility of either gas in its pure phase than in a mixture (Henry's Law, i.e., X=HY, where X is the mole fraction of the dissolved species, Y, the mole fraction of the species in the gas phase and H, being the Henry's Law constant). About 25 mg of catalyst was used for the reaction and suspended in 30 ml of reaction media. Usually, 0.1 N sulfuric acid and 0.1 N HCl were used for the acid-aqueous reaction media. For the aqueous/organic reaction media, 20 ml of acetone was used with 10 ml of 0.1N sulfuric acid, unless otherwise mentioned.

Measurement of hydrogen peroxide concentration

The measurement of hydrogen peroxide in the reaction medium was carried out by taking 100 $\mu$L of the reaction solution, diluting it with water, and calorimetrically analyzing the hydrogen peroxide with a ferrous thiocyanate indicator (analysis kit available for Chemetrics, Inc.). The hydrogen peroxide forms a red color that shows an absorption peak at about 475 nm, which is measured and calibrated with some standards purchased from the company. The concentration of hydrogen peroxide in the reactor was monitored over time, until steady state was reached, where the rate of hydrogen peroxide production equaled the rate of its decomposition.

Calculation of specific rates

The specific rate for hydrogen peroxide production has been equated to the rate of accumulation of hydrogen peroxide, as it is a batch system, and can be illustrated by a simple material balance on hydrogen peroxide. A polynomial was curve-fitted to the plot of $H_2O_2$ vs time in each case. This best-fit polynomial was then differentiated with respect to time, analytically to give the plot of rate vs time. In order to calculate the specific rates, i.e. rate per gram of catalyst, the rates were divided by the mass of the catalyst per unit volume of the reaction medium.

(i) Results: $H_2O_2$ production in 0.1 M $H^+$($H_2SO_4$ or HCl) aqueous media

The steady state concentration of hydrogen peroxide production after several hours of reaction has been reported for several of our catalysts in Tables 1 and 2, below. In most cases the concentrations of hydrogen peroxide is close to the equilibrium where its rate of formation equals its rate of decomposition. The time expressed here in column 3 tells us after how many hours, the reaction approaches equilibrium conditions, where the rate of production of hydrogen peroxide equals the rate of its decomposition.

(ii) Results: $H_2O_2$ production in acetone/0.1 M $H^+$($H_2SO_4$) media

Figure 2:
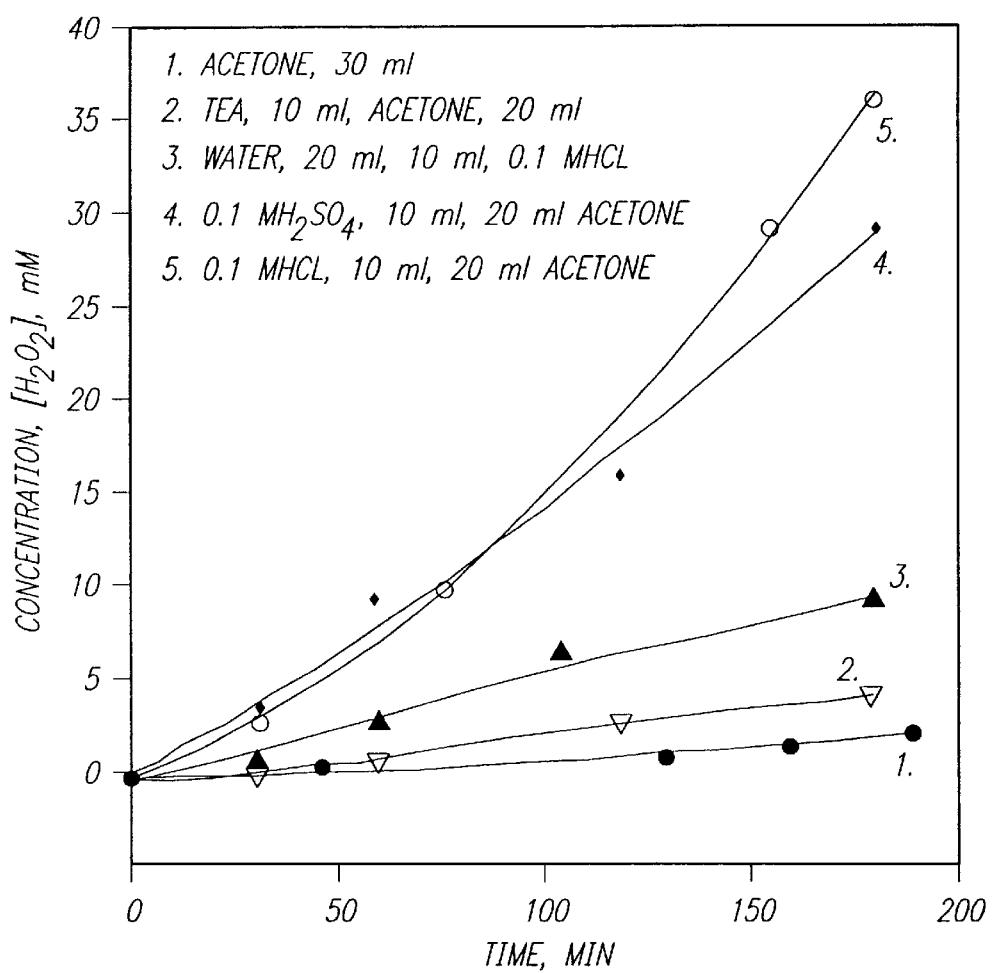
FIG. 2 is a comparison of $H_2O_2$ concentration at a given time using various reaction mediums.

A representative reaction medium with 20 ml of acetone and 10 ml of 0.1 N acid ($H_2SO_4$) was tried out and compared with several reaction media in which TEA is tetraethyl ammonium chloride. A representative catalyst, SCRI124, was used for this purpose (FIG. 2).

Influence of acetone in the enhancement of hydrogen peroxide yields

The combination of acetone with sulfuric or hydrochloric acid gives the best activity towards hydrogen peroxide production. The use of acetone as a reaction medium has another motivation. The solubility of oxygen in water is about 40 mg/l at ambient temperatures, while in acetone, the solubility increases to 365 mg/l.

Figure 3:
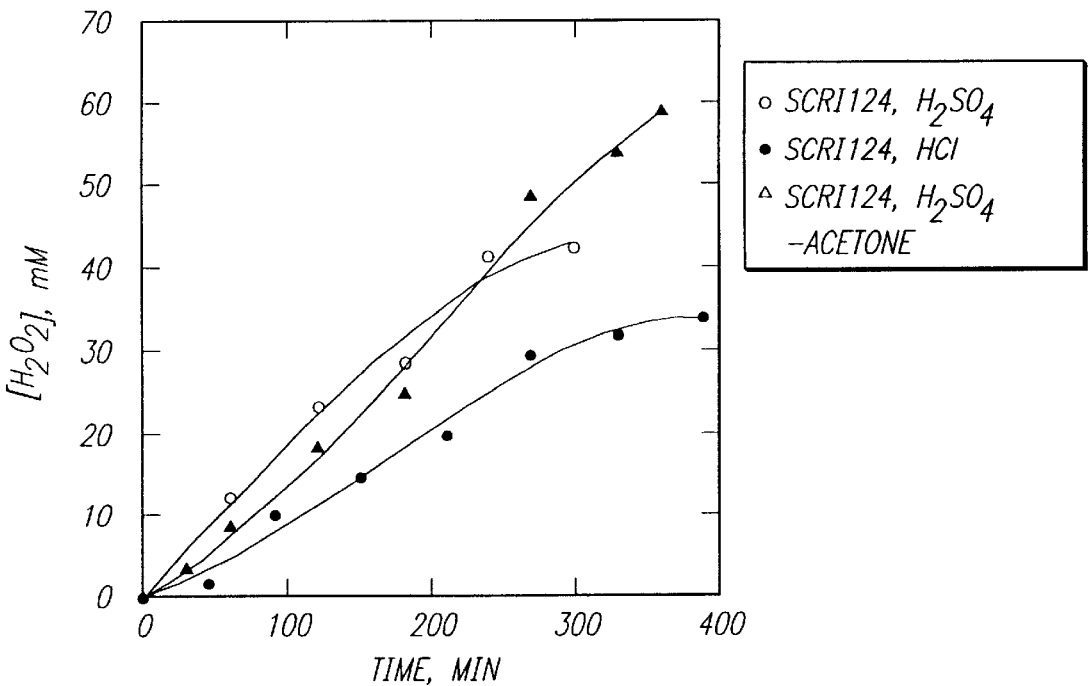
FIG. 3 compares the amount and rate of $H_2O_2$ at a given time in various reaction mediums and with a specific catalyst.
Figure 3:
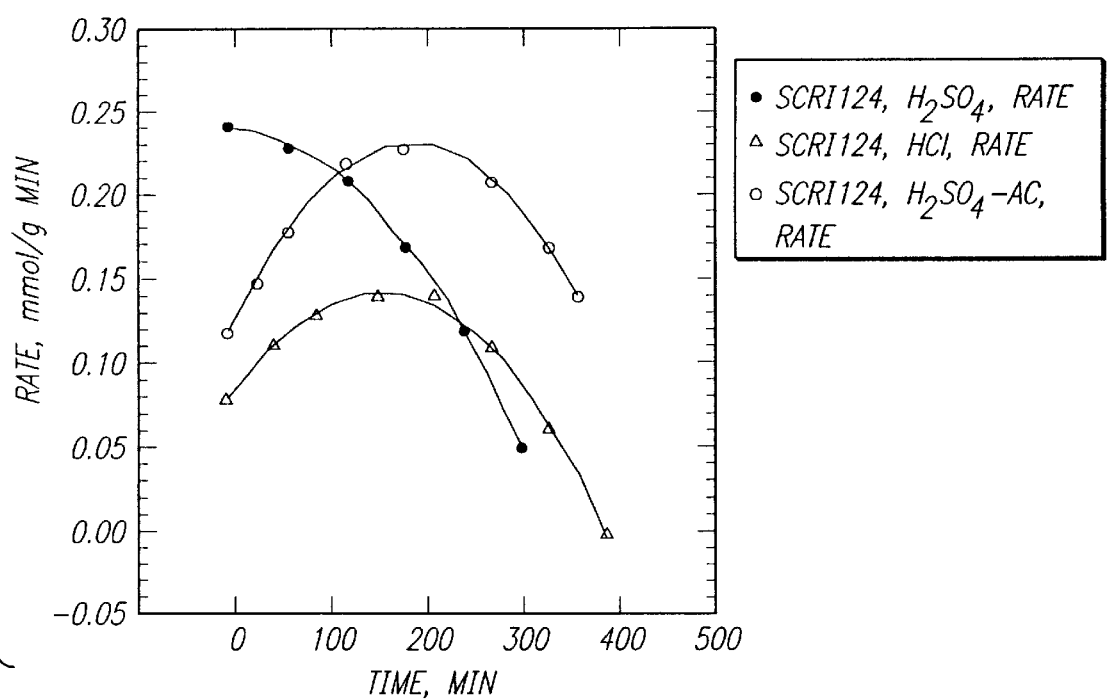
Figure 4:
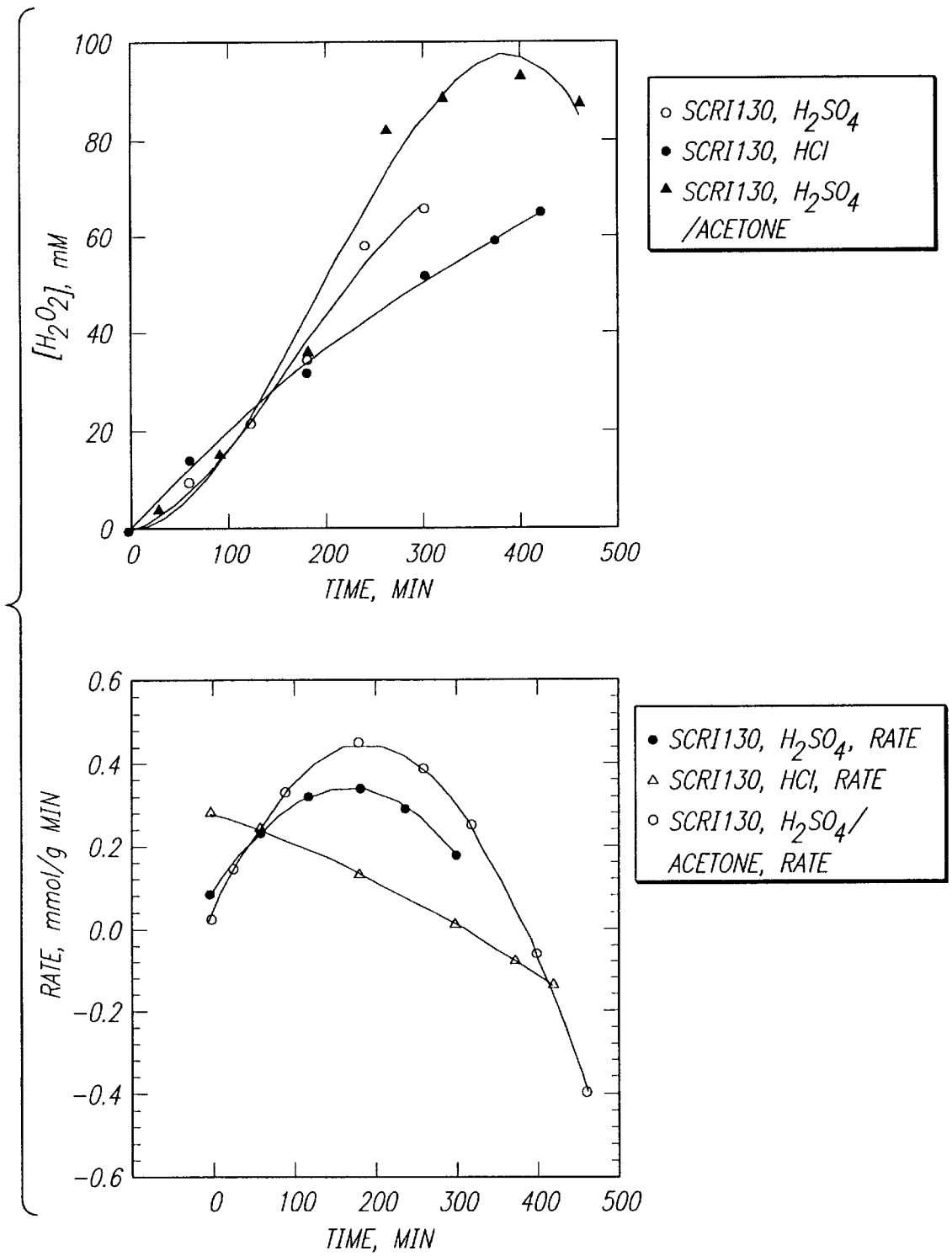
FIG. 4 compares the amount and rate of $H_2O_2$ at a given time in various reaction mediums and with a specific catalyst.

To demonstrate conclusively the influence of acetone, a detailed set of experiments over an extended period of time were done, and comparison shown in FIGS. 3 and 4, as well as in Tables 1 and 2 for the supported catalysts, SCRI124 and SCRI130. As may be seen, in both cases, the presence of acetone, allows higher buildup of hydrogen peroxide and over longer time, thereby indicating the propensity of the forward reaction of hydrogen peroxide formation to dominate over the undesired step of decomposition of the latter.

Figure 5:
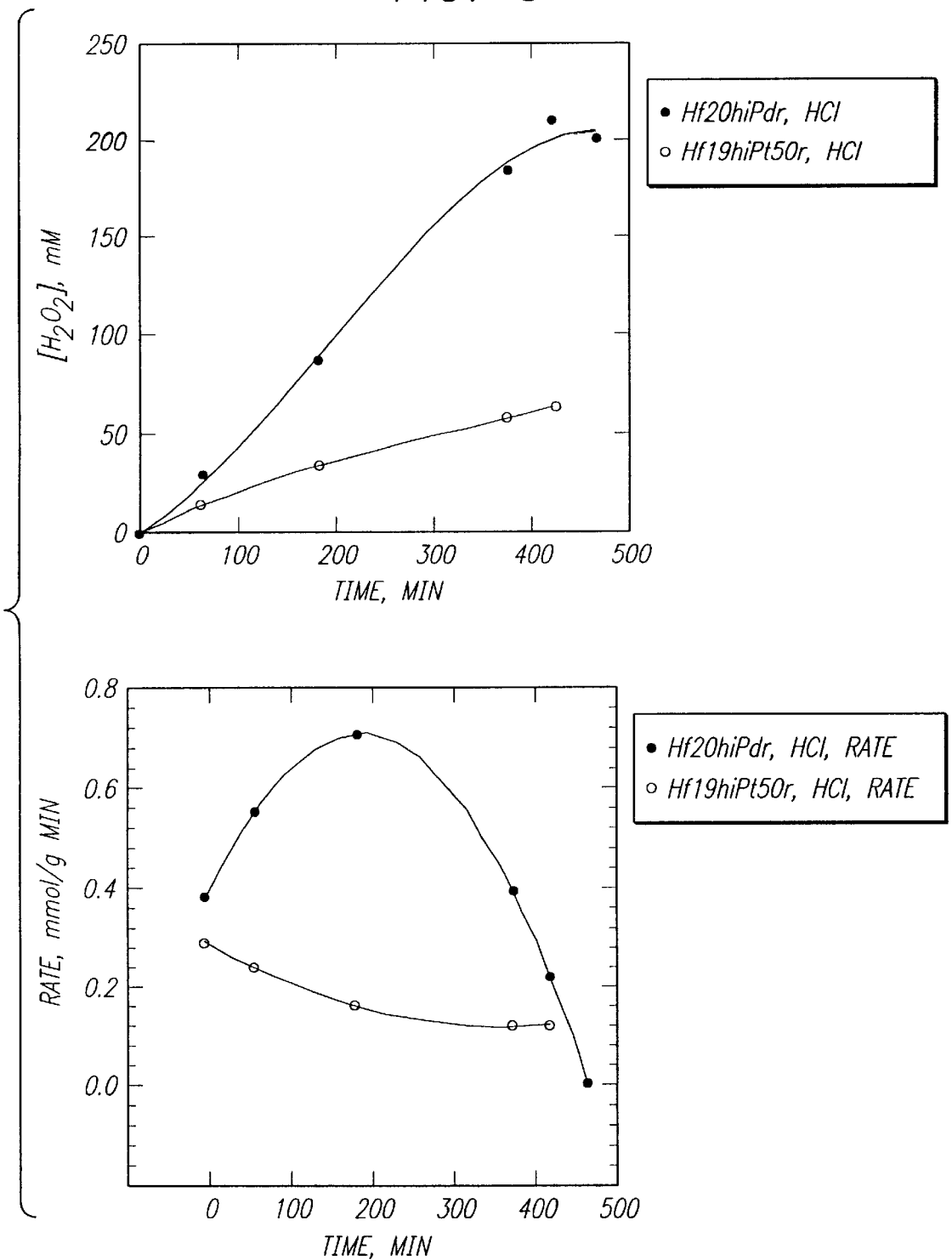
FIG. 5 shows the effect of the reaction medium on the performance of bulk porous catalysts.
Figure 6:
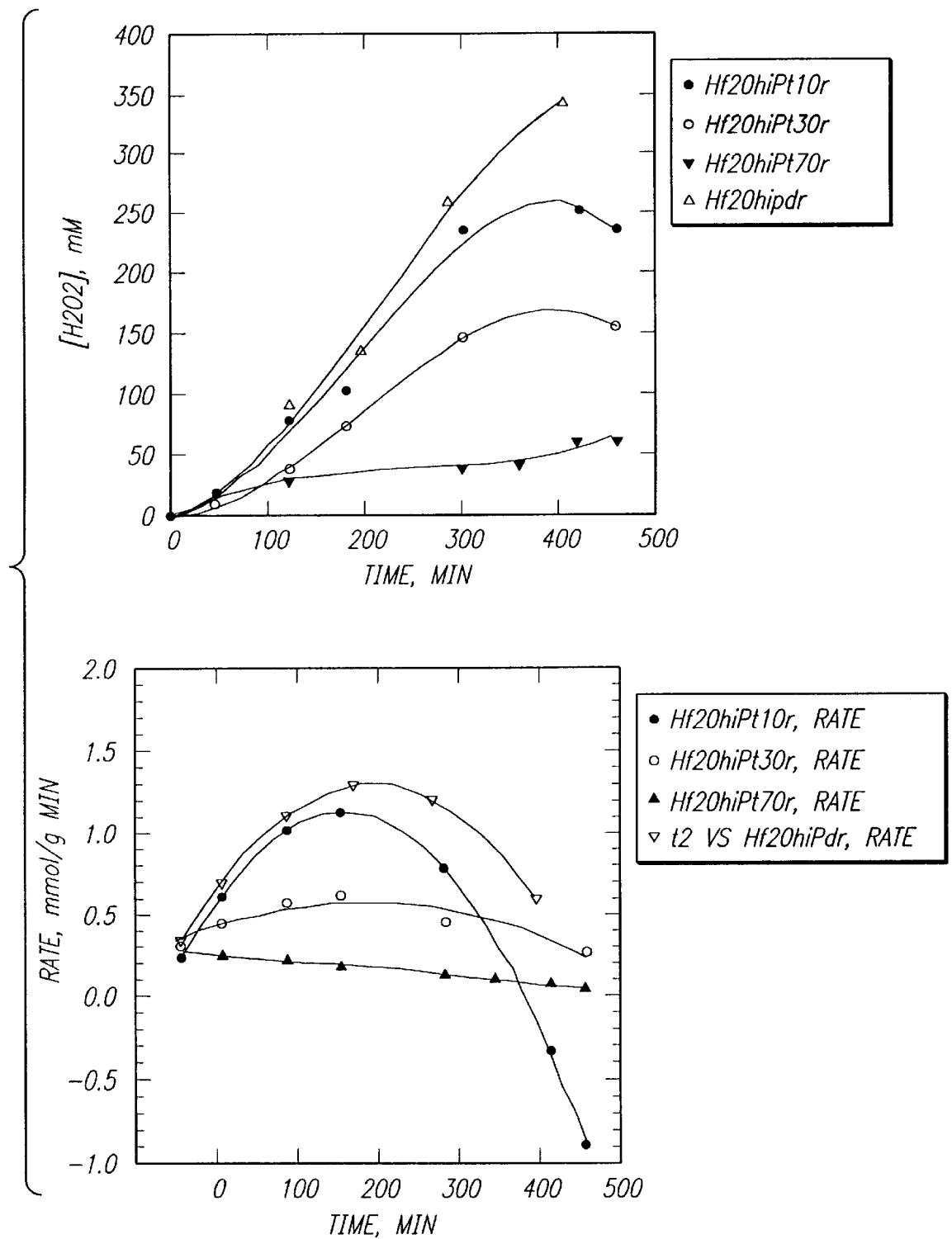
FIG. 6 shows the effect of the reaction medium on the performance of bulk porous catalysts.

The effect of reaction medium on the performance of the bulk porous catalysts is even more pronounced and may be seen from the steady state concentrations and maximum rates of hydrogen peroxide in cases of catalysts Hfl9hiPt50r and Hf20hiPdr, (Tables 2 and 3, FIGS. 5 and 6). These numbers show a drastic increase upon using acetone/sulfuric acid media, as opposed to HCl.

Figure 12:
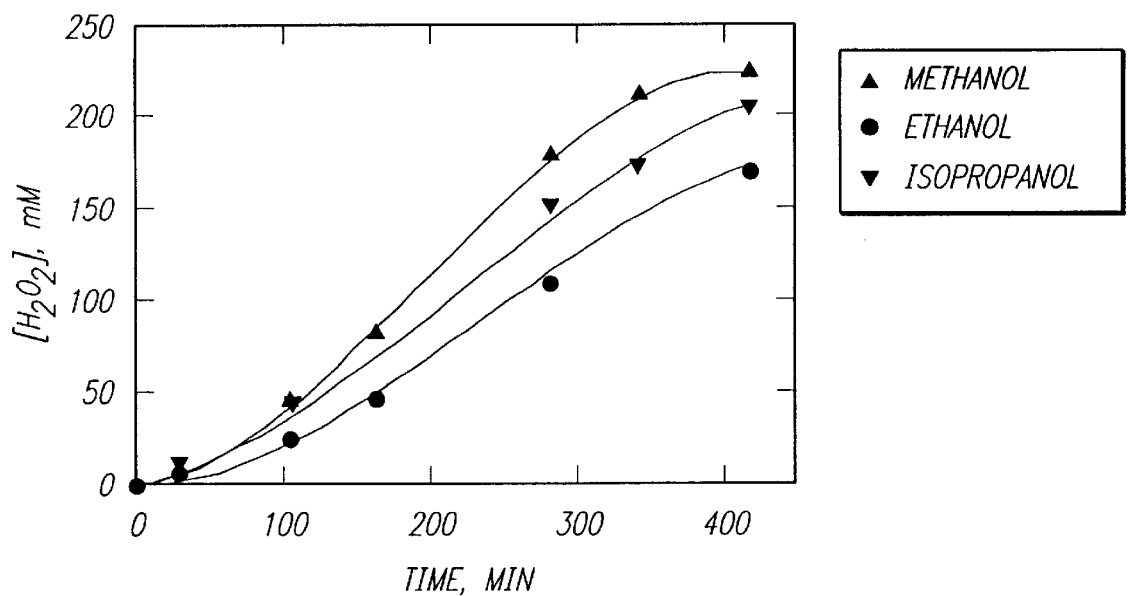
FIG. 12 shows the kinetics of $H_2O_2$ production in various reaction mediums.

FIG. 12 shows comparative behavior of the kinetics of hydrogen peroxide production in a reaction medium containing 10 ml of 0.1 N $H_2SO_4$ along with 20 ml of an alcohol. The alcohols used are—methanol, ethanol and isopropanol. The catalyst used in this sequence of experiments is Hf23hiPdr (a bulk phase porous catalyst). The reaction medium with methanol shows about 220 mM production of hydrogen peroxide, after about 7 hours, while the isopropanol is around 210 mM and the ethanol, about 170 mM. There is little evidence of the kinetics being a function of solubility of oxygen.

Figure 13:
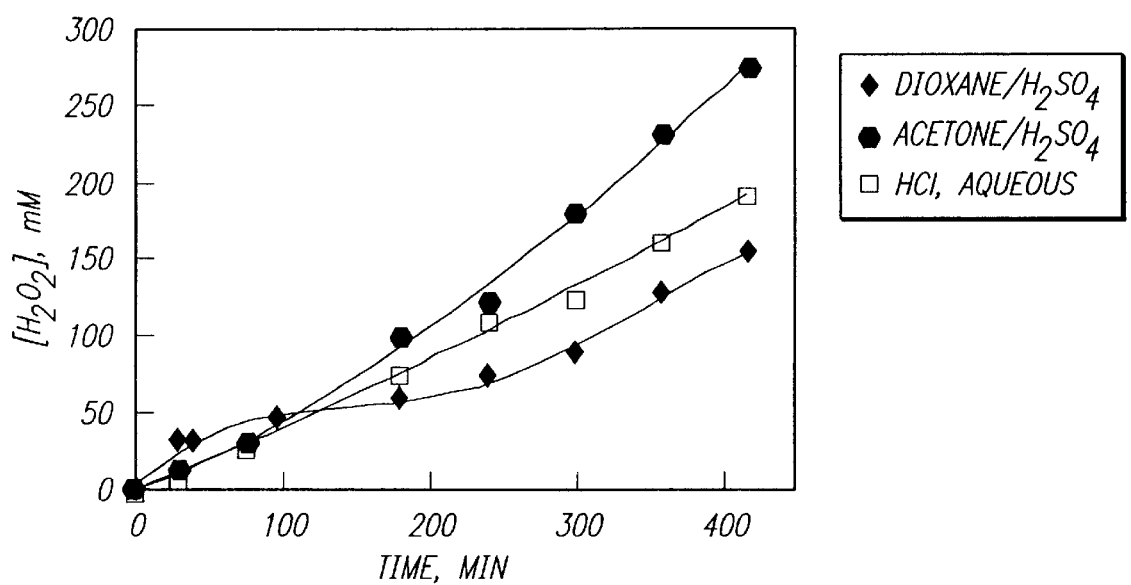
FIG. 13 shows $H_2O_2$ production using sulfuric and hydrochloric acids.

FIG. 13 illustrates the behavior of acetone/sulfuric acid is contrasted with dioxane/sulfuric acid and also with aqueous HCl. The acetone/sulfuric acid system is clearly the best, producing about 275 mM of hydrogen peroxide after about 7 hours, as compared to 195 mM for aqueous HCl and 153 mM for dioxane/sulfuric acid system. The solubility of oxygen in the solvents cannot explain the higher level of hydrogen peroxide produced with aqueous HCl as compared to dioxane/sulfuric acid.

Figure 14:
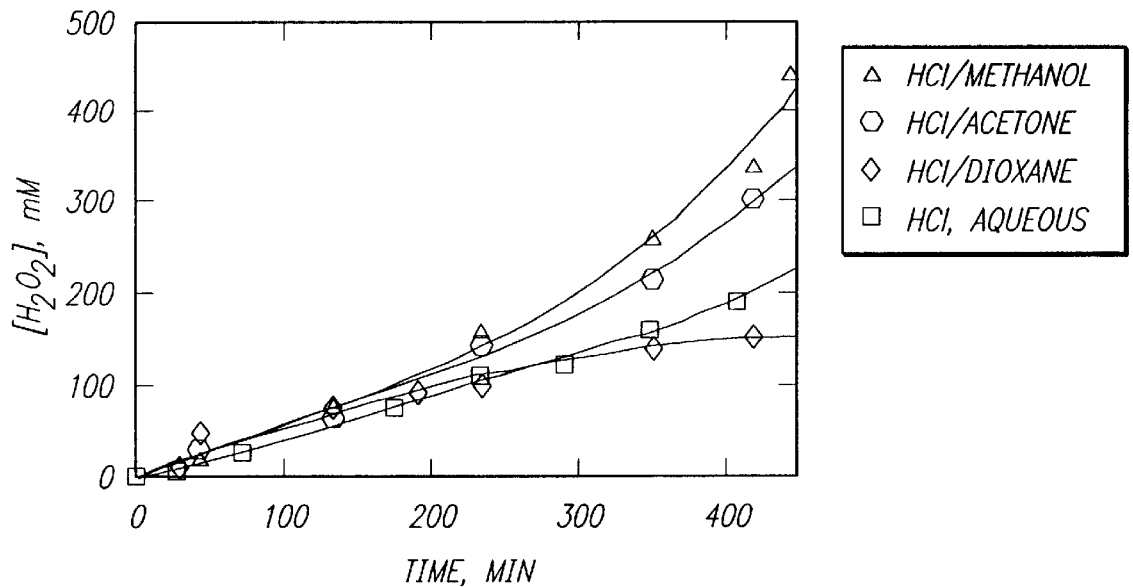
FIG. 14 compares reaction mediums having hydrochloric acid or sulfuric acid.

FIG. 14 shows the effect of HCl instead of $H_2SO_4$ to solvents such as methanol, acetone and dioxane, has been illustrated here. In this case, too it can be observed that the acetone/HCl system shows higher yields of hydrogen peroxide (301 mM, 7 hours) than aqueous HCl (195 mM) and dioxane/HCl (150 mM). The difference is that, the methanol/HCl system exhibits hydrogen peroxide levels of 430 mM, the highest obtained so far. The question then, is to observe the effect of the halide and this has been shown in FIGS. 15 and 16. From this data, also, it is not evident that there is any effect of oxygen solubility in the reaction media on the kinetics of hydrogen peroxide production.

Figure 15:
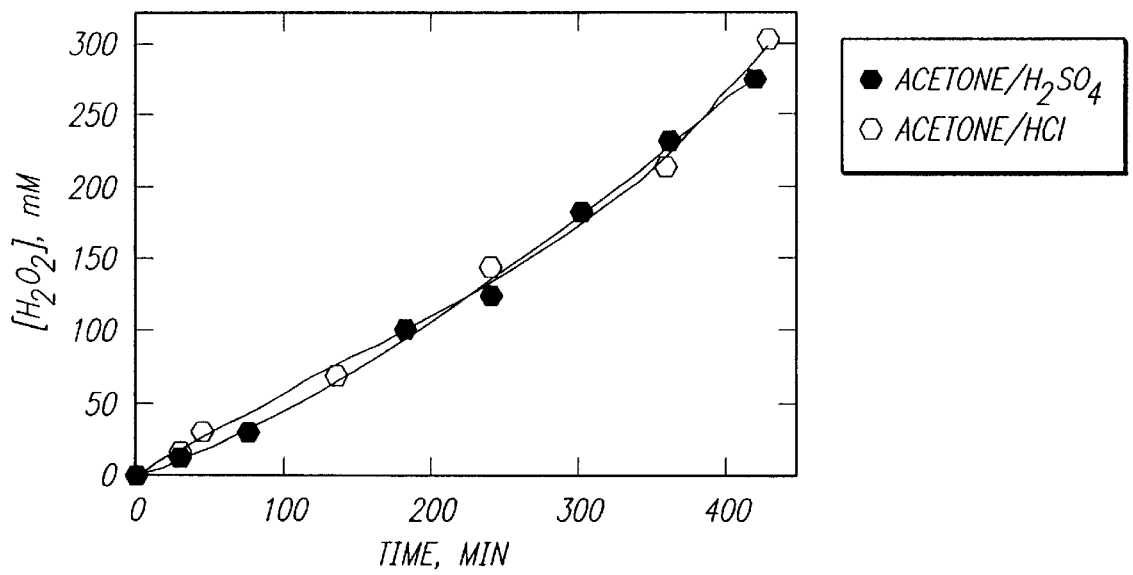
FIG. 15 compares the halide effect with acetone.
Figure 16:
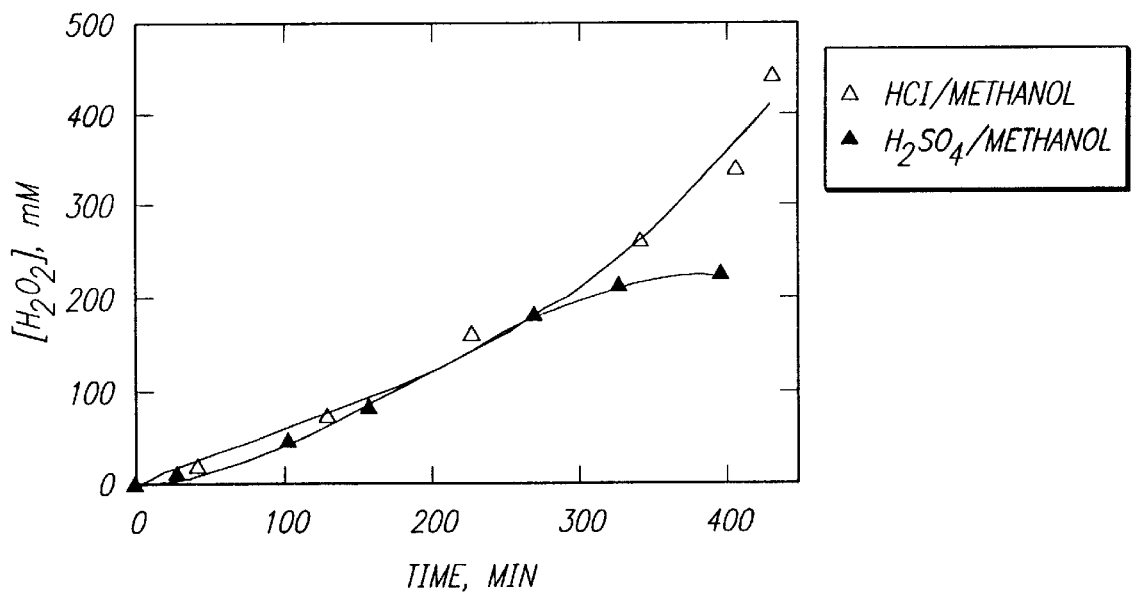
FIG. 16 compares the halide effect with methanol.

In FIG. 15, we have a comparison of the hydrogen peroxide buildup in acetone/HCl and acetone/$H_2SO_4$. Clearly there is no 'Halide effect', as can been demonstrated in the figure. However, methanol/HCl and methanol/$H_2SO_4$ (FIG. 16) systems show almost exactly the same behavior till about 6 hours. After that there seems to be an increase in $H_2O_2$ levels in the methanol/HCl system, to about 430 mM, whereas the methanol/$H_2SO_4$ shows signs of equilibriation after about 7 hours.

Figure 17:
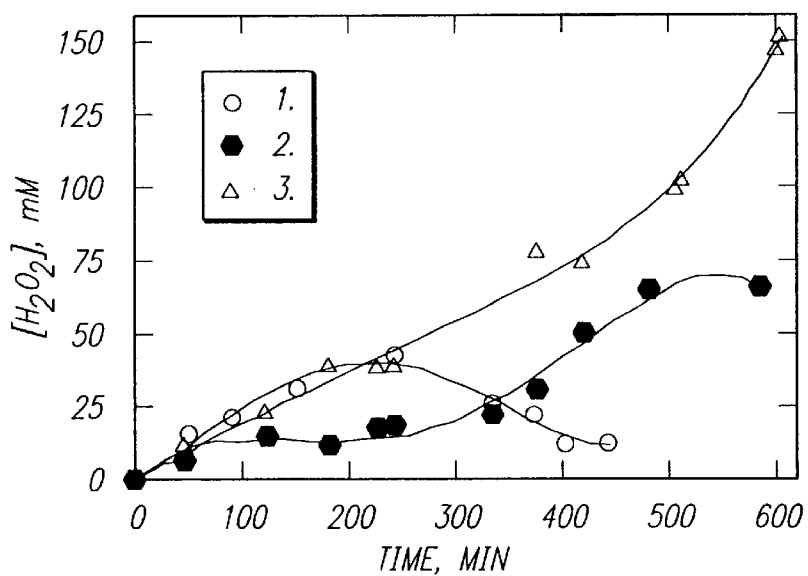
FIG. 17 compares $H_2O_2$ production using various catalysts.

FIG. 17 shows that when a supported catalyst (Pd/$SiO_2$) on which 3 layers of anthraquinone derivative (ANQ) were grown, was used in a suspension with acetone/$H_2SO_4$, the hydrogen peroxide levels rise to about 45 mM after 4 hours followed by a rapid decomposition to levels of 12 mM. This phenomenon is attributed to the ring hydrogenation of the ANQ, catalyzed by the Pd aggregates.

Figure 18:
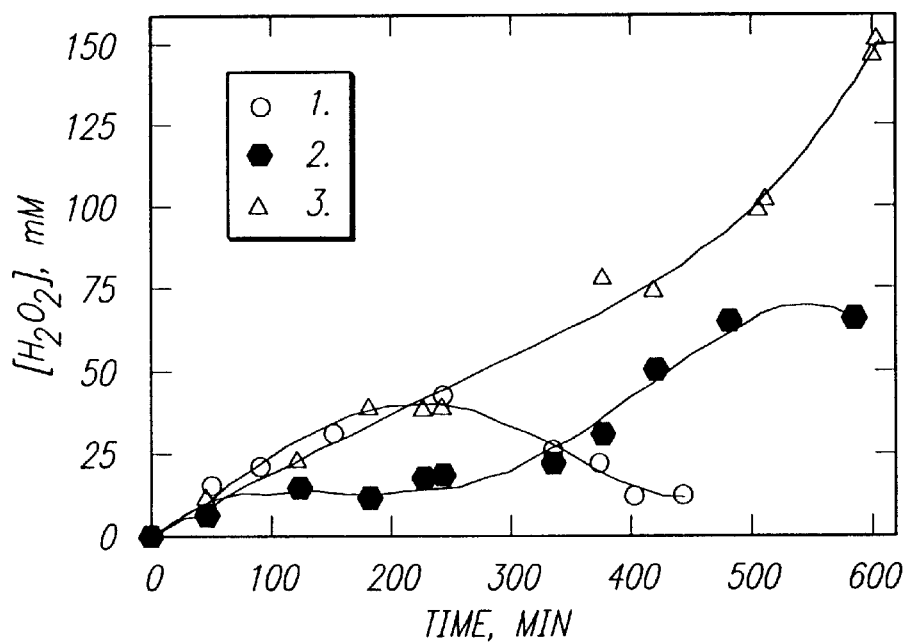
FIG. 18 compares $H_2O_2$ production using various catalysts.

In order to prevent this undesirable reaction, we have introduced a spacer between the ANQ and the Pd aggregates e.g. naphthalene derivative (NAP) (catalyst name: FASiIPdNAP1ANQ2) or viologen bisphosphonate (PV) (catalyst name: FASiIPdPV1ANQ2). The results shown in FIG. 18 conclusively demonstrate that this modification has decreased the undesirable reaction and enhanced the yields of hydrogen peroxide (up to 150 mM (FASiIPdPV1ANQ2) and 66 mM (FASiIPdNAP1ANQ2)) and sustained it over a longer period of time.

Effect of Pt/(Pt+Pd) on the production of hydrogen peroxide

Pt is an excellent electrocatalyst for the first step of electron abstraction from dissolved hydrogen. In this step, Pt is superior to Pd. On the other hand, Pt is also very active in the undesirable reaction of hydrogen peroxide decomposition. It has been reported earlier, that a suitable combination of Pt and Pd in the catalyst gives the best yields for hydrogen peroxide production. However, we can see that a catalyst with only Pd gives the highest efficiency for hydrogen peroxide production. A reason for this may be attributed to segregated phases of Pt and Pd (as observed by TEM and EDX analysis). Our method of ion-exchange and reduction is a low temperature process and the formation of a bimetallic, alloyed phase is not observed. The presence of Pt therefore, enhances the decomposition of the peroxide formed. Table 3 clearly shows this trend and so does FIG. 6. The lower the Pt/(Pt+Pd) in the catalyst, the higher the rate of peroxide production and the higher the equilibrium values of hydrogen peroxide produced.

Figure 7:
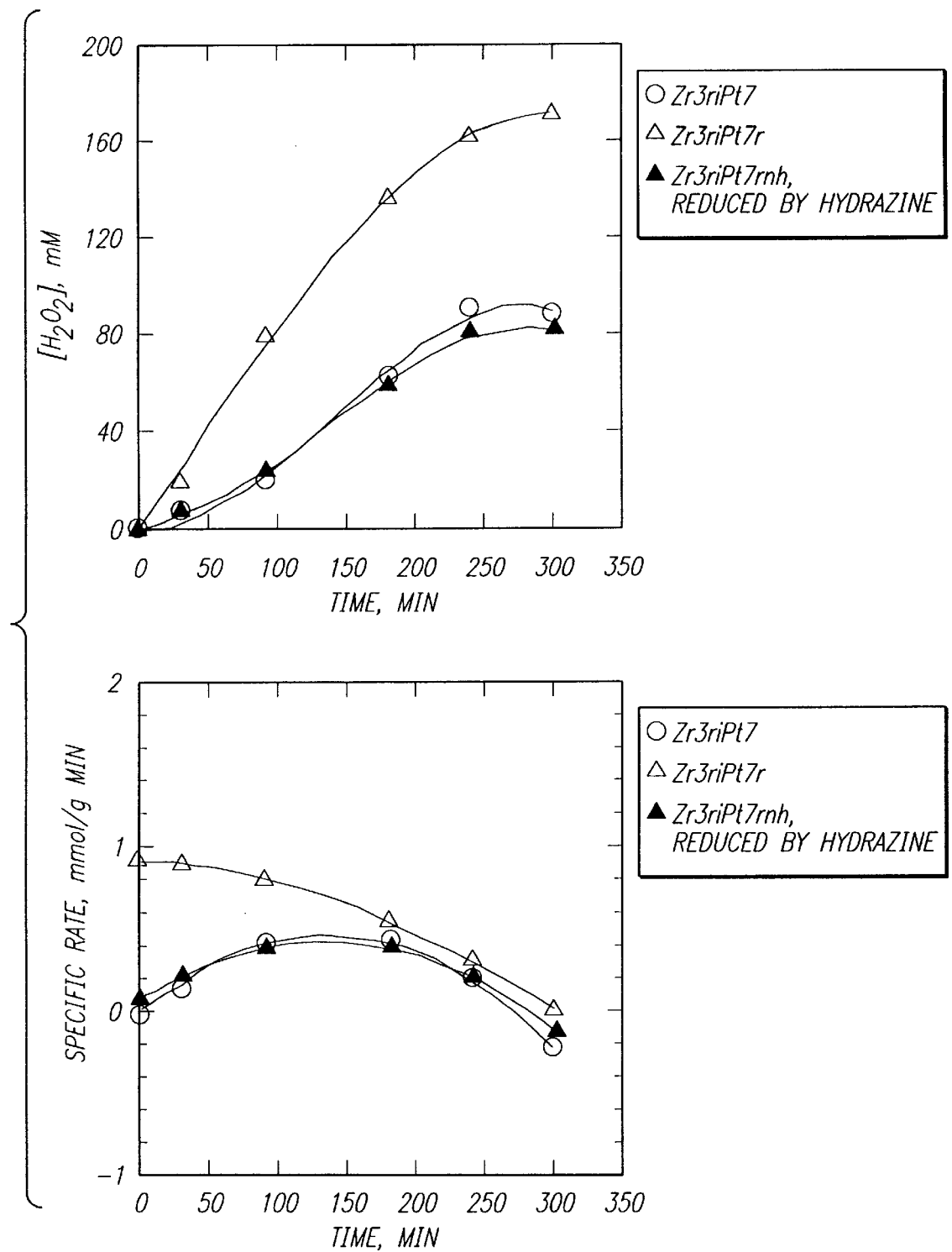
FIG. 7 shows rate and amount of $H_2O_2$ at a given time using various catalyst.
Figure 8:
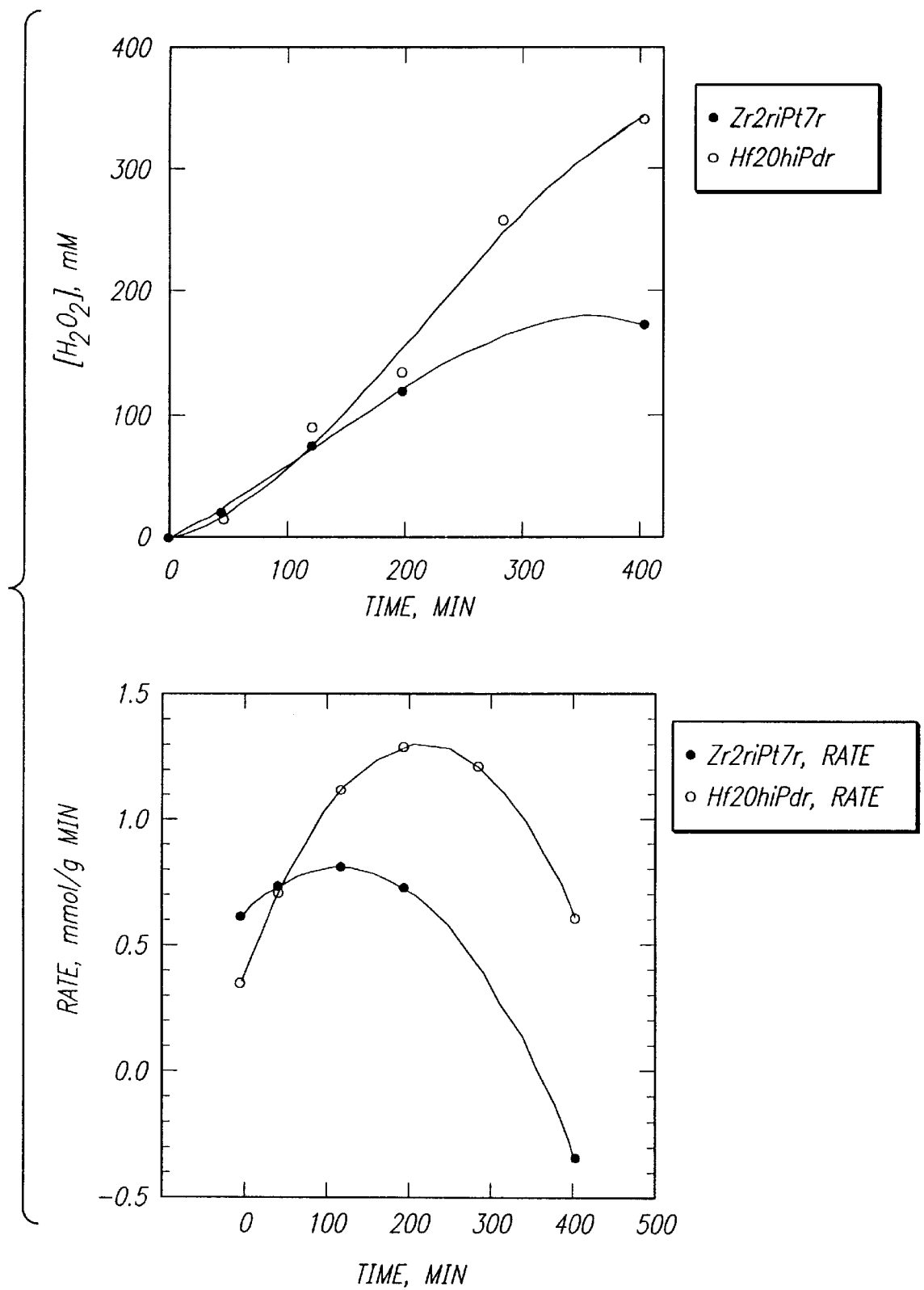
FIG. 8 shows rate and amount of $H_2O_2$ at a given time using various catalyst.

Effect of synthesis mode for bulk porous catalysts FIGS. 7 and 8 show some exceptions to the last rule. The 2 reflux synthesized catalysts (Zr2riPt7r, FIG. 8, and Zr3riPt7r, FIG. 7) show approximately similar equilibrium concentrations of hydrogen peroxide produced and maximum rates that vary from 0.8 to 0.9 mmol/g min. ICP-MS data reveal disparities in the Pd and Zr levels. The effect of higher Pd is to enhance the catalytic activity but lower Zr levels would indicate lower crystallinity and therefore, a poorer dispersion of active sites. Hydrothermal catalysts, show much higher crystallinity and therefore statistically enhance active site dispersion. Their catalytic activity appears to be higher than reflux synthesized catalysts too (Table 3, FIGS. 6 and 8), provided that the Pt levels in either case are similar.

Effect of pre-reduction on hydrogen peroxide production

Figure 9:
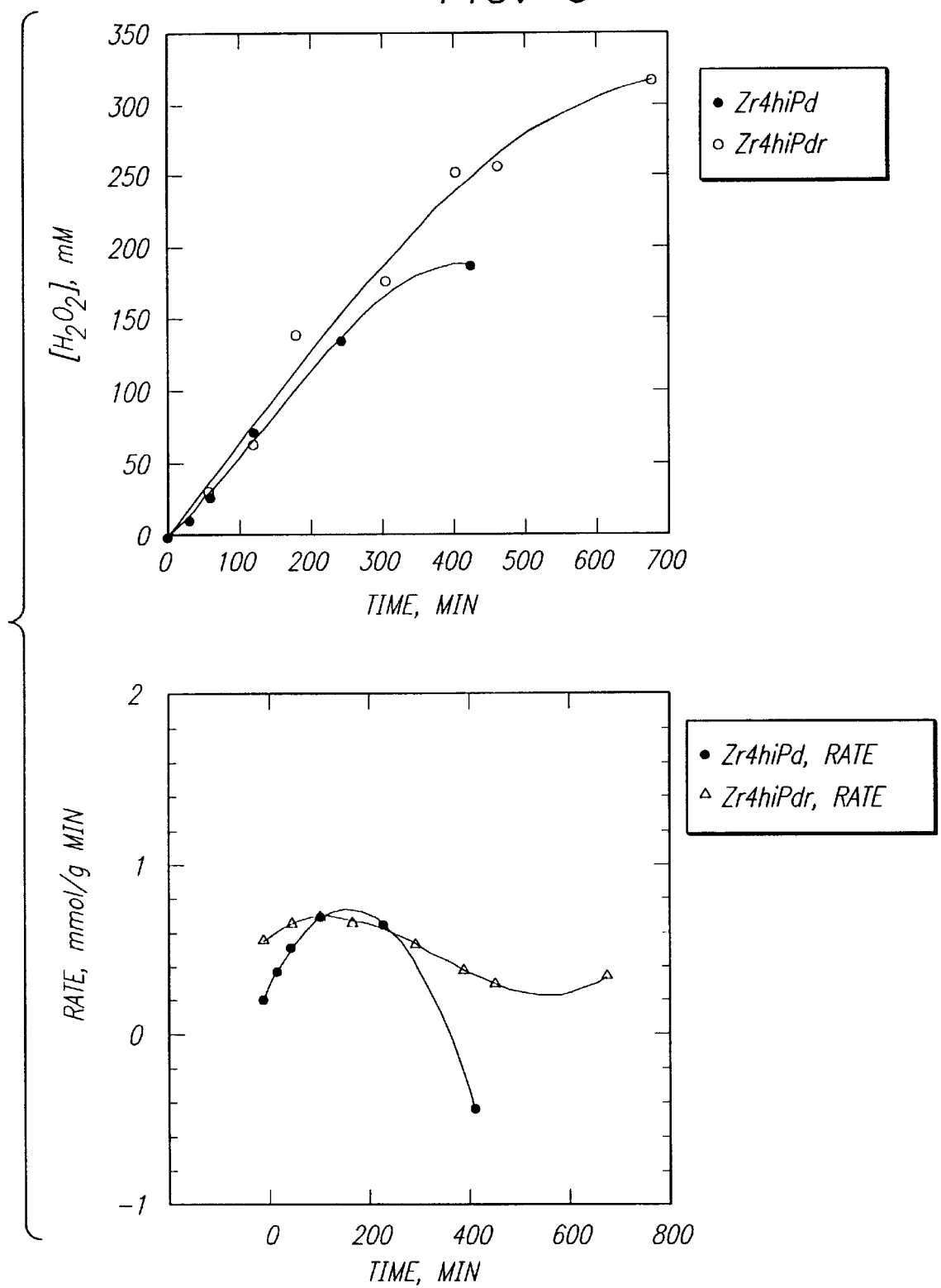
FIG. 9 compares the performance of two catalysts.

FIG. 9 shows 2 bulk phase porous catalysts, both prepared by hydrothermal synthesis. Catalyst Zr4hiPd, has been only ion-exchanged, not reduced. As the reaction proceeds, there is some reduction, but the concentration of reduced viologen in the catalyst is limited, as the flow rate of hydrogen is less than one-tenth the flow rate of oxygen. Therefore, the overall buildup of hydrogen peroxide is lower than in the case, where the catalyst was pre-reduced, i.e. Zr4hiPdr. The effect of pre-reduction is to enhance the quantity of reduced viologen sites in the catalyst.

Figure 10:
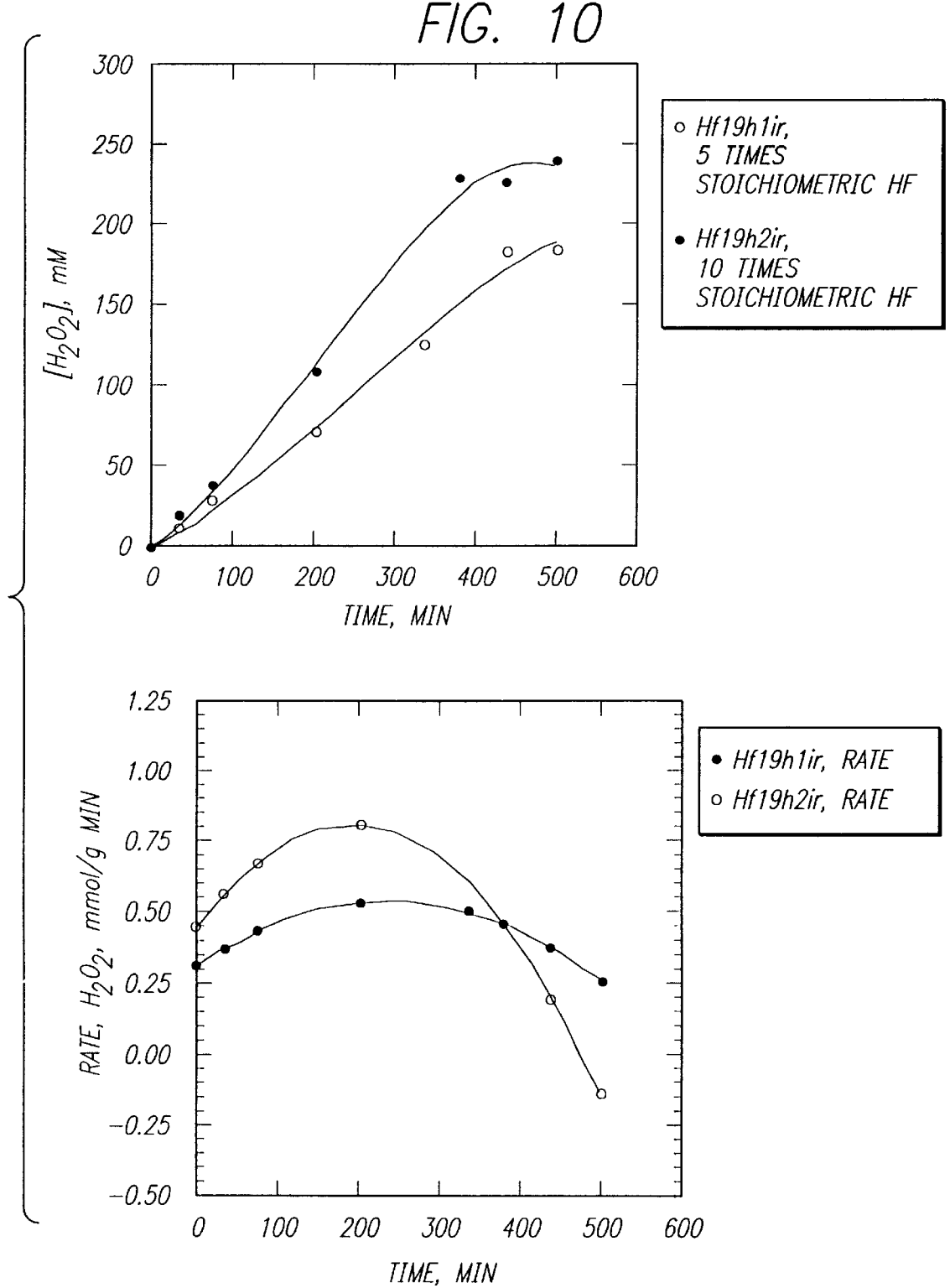
FIG. 10 shows the effect of mineralized content on catalytic activity.

Effect of mineralizer content (HF) in hydrothermal synthesis on the catalytic activity of the bulk porous catalyst In the presence of HF in the hydrothermal synthesis process affects the crystal size of the materials. Compare the catalytic activity of Hf19h1ir and Hf19h2ir. Both have very similar contents of Pt and Pd after ion-exchange. Hf19h1ir was prepared by using 5 times the stoichiometric quantity of mineralizer (HF) during hydrothermal preparation, where as Hf19h2ir was prepared with 10 times the stoichiometric amount of HF. Increased mineralizer levels enhance the size of the crystals. FIG. 10 shows, that the catalytic activity is also enhanced by increased HF levels.

Optimization of the role of Platinum, the FASiKPtPV2 catalyst

The catalyst FASiKPtPV2 is unique in its structure and composition. The growth of viologen layers on the Pt attached to the silica support (described in the synthesis section) is critical in minimizing the destructive role of Pt. The presence of viologen layers introduces diffusional resistance to the molecules of hydrogen peroxide. Assuming that the hydrogen being very small will be able to diffuse and reach the Pt supported on silica, we are thus allowing the preliminary step of electron abstraction by electrocatalysis to proceed. The peroxide production reaction which would take place on the viologen site will proceed normally but due to diffusional constraints arising from the dense packing of viologen layers, the back diffusion of hydrogen peroxide will be limited and it will not be able to have ready access to the Pt sites that would otherwise facilitate its decomposition.

The results obtained from using this geometry in acetone/sulfuric acid medium are very encouraging. For the first time, a Pt-based catalyst has demonstrated successful production of hydrogen peroxide.

Pure Pd supported on silica with viologen bisphosphonate layers (FASiIPdPV3) or anthraquinone derivative layers (FASiIPdANQ3)

Figure 11:
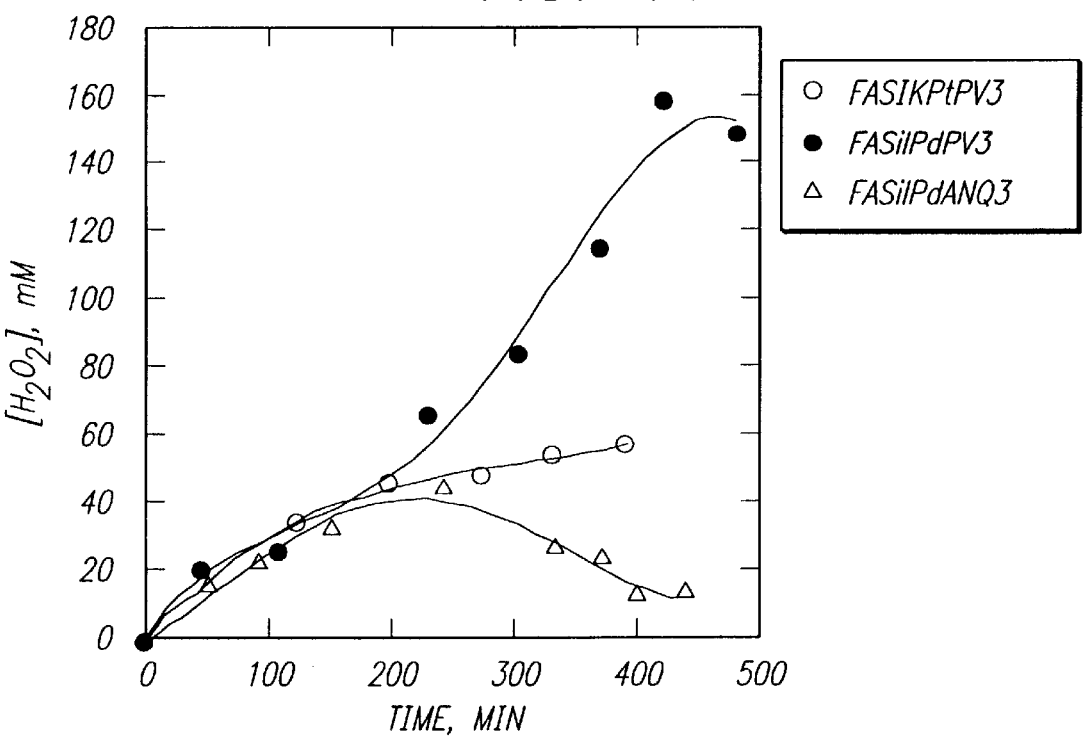
FIG. 11 shows amount and rate of $H_2O_2$ using various catalysts.
Figure 11:
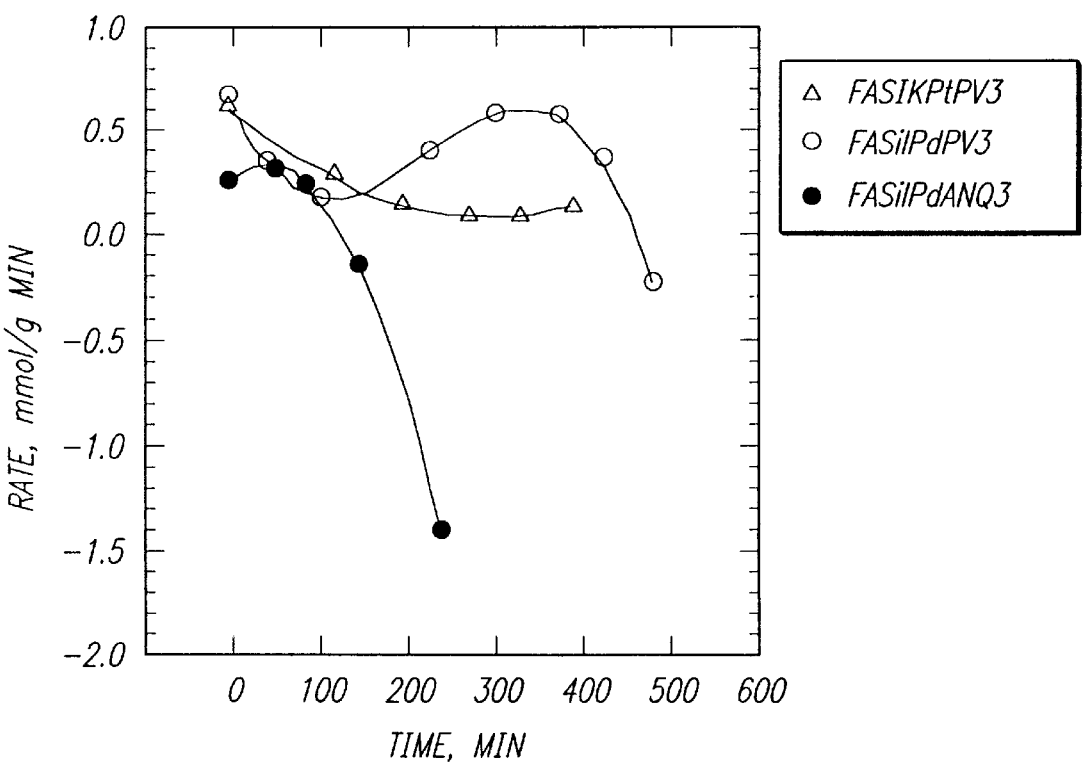

Pd deposited upon silica with PV layers grown on it, is definitely a very efficient catalyst, as is evidenced by the kinetic data shown in Table 3 and FIG. 11. For any supported system so far, this is the maximum production of hydrogen peroxide achieved. The same system with ANQ instead of PV, shows a quick buildup of hydrogen peroxide, i.e. good initial rates, but very quickly deactivates, resulting in a drastic reduction in the hydrogen peroxide levels in the reactor until, a new steady state is achieved. The reasons for this decomposition are attributed to loss of active sites in the catalyst, owing to hydrogenation of the aromatic rings in the ANQ. The optimal sequence of growth of ANQ along with PV on the surface of these supported catalysts, is being currently studied.

Final Synthesis of Supported Silica Based Catalysts

EtOSiHMe2—Modified Silica Particles Si—DMES.

To a suspension of silica particles in acetone (1 g of silica/200 mL acetone) was added dimethylethoxysilane (2.20 mL, 16 mmol). The mixture was stirred under reflux for 36 h. The Si—DMES was cleaned from unreacted silane agent using five centrifugation/redispersion cycles in acetone. FTIR(DRIFTS) υ Si—H 2137 cm$^{-1}$; this peak was not observed in the particles (Si—OH) before modification with DMES.

Modification of Si—DMES Particles with Platinum nanoparticles Si—DMES—PT.

To a suspension of Si—DMES (0.1 g) dispersed in THF (10 mL) was added Karstedt's Pt catalyst[3] (5 mL of 3% solution Platinum divinyltetramethyldisiloxane Complex in xylene) under an open atmosphere. The suspension was heated for 8 h at 60° C. The silica-supported platinum nanoparticles, Si—DMES—PT, was cleaned with THF using five centrifugation / redispersion cycles.

Modification of Si—DMES—PT with ZrPV(Cl).

Pt-modified silica particles was initialized with 4-mercaptobutyl)phosphonic acid (5 mM solution in ethanol) over night under nitrogen to produce a phosphonic acid rich surface. Si—DMES—PT—S($CH_2$)$_4$PO(OH)$_2$, was cleaned with $H_2O$ using three centrifugation/redispersion cycles, the modified particles were ready for treatment in metal solution. While stirring ZrPV(Cl) films were grown on Si—DMES—PT—S($CH_2$)4PO(OH)$_2$ by alternate treatment in 10 mM Viologenbisphosphonic acid solution at 60° C. for over night and room temperature treatment in 100 mM $ZrOCl_2$ aqueous solution for 3 h. The particles were thoroughly cleaned with $H_2O$ using three centrifugation/redispersion cycles between treatments.

Modification of Silica Particles with Palladium Si—Pd.

To 0.25 g of silica particles was added a 0.75 mL aqueous solution of $Na_2PdCl4$ (2% atom/molecule of Pd to $SiO_2$). The mixture were dried over night at 110° C. Pd-salt-modified particles was calcified in air at 400° C. for 2 h then it was reduced at 400° C. using a stream of 5% $H_2$/95% $N_2$ (rate 100 ml/min) for 4 h.

Modification of Silica Particles with Nickel Si—Ni.

To 0.25 g of silica particles was added a 0.75 mL aqueous solution of $NiCl_2$ (2% atom/molecule of Ni to $SiO_2$). The mixture were dried over night at 110° C. Ni-salt-modified particles was calcified in air at 400° C. for 2 h then it was reduced at 400° C. using a stream of 5% $H_2$/95% $N_2$ (rate 100 ml/min) for 4 h.

Modification of functionalized Lattex Particles with Palladium PS—Pd.

To a suspension of functionalized polystyrene particles (carboxylic acid or amine) in water (0.05 g of silica/5 mL $H_2O$) was added a solution of 0.2 M $Na_2PdCl_4$ in 0.01 M KOH aqueous solution). The suspension were stirred for 20 hs. PS—Pd, was cleaned with $H_2O$ using three centrifugation/redispersion cycles. The modified polystyrene particles was reduced by stirring in 10 mL of 0.01 M $N_2H_2$. The Pd-modified latex particles were cleaned with $H_2O$ using three centrifugation/redispersion cycles.

Modification of Si—Pd or PS—Pd with ZrPV(Cl).

Pd-modified particles was initialized with 4-mercaptobutyl)phosphonic acid (1 mM solution in ethanol) over night under nitrogen to produce a phosphonic acid rich surface. Particles—Pd—$S(CH_2)_4PO(OH)_2$, was cleaned with $H_2O$ using three centrifugation/redispersion cycles, the modified particles were ready for treatment in metal solution. While stirring ZrPV(Cl) films were grown on Particles—Pd—$S(CH_2)_4PO(OH)_2$ by alternate treatment in 1.5 mM Viologenbisphosphonic acid solution at 60° C. for over night and room temperature treatment in 20 mM ZrOCl2 aqueous solution for 3 h . The particles were thoroughly cleaned with $H_2O$ using three centrifugation/redispersion cycles between treatments.

Modification of Si—Pd or PS—Pd with ZrANQ.

Pd-modified particles was initialized with (4-mercaptobutyl)phosphonic acid (1 mM solution in ethanol) over night under nitrogen to produce a phosphonic acid rich surface. Particles—Pd—$S(CH_2)_4PO(OH)_2$, was cleaned with $H_2O$ using three centrifugation/redispersion cycles, the modified particles were ready for treatment in metal solution. While stirring ZrANQ films were grown on Particles—Pd—$S(CH_2)_4PO(OH)_2$ by alternate treatment in 1.5 mM solution of 2,6-dihydoxyanthraquinone bisphosphonic acid derivative at 60° C. for over night and room temperature treatment in 20 mM ZrOCl2 aqueous solution for 3 h . The ZrANQ-modified particles were thoroughly cleaned with $H_2O$ using three centrifugation/redispersion cycles between treatments.

Modification of Si—Ni with ZrPV(Cl) or ZrANQ.

Ni-modified particles was initialized with 4-mercaptobutyl)phosphonic acid (1 mM solution in ethanol) over night under nitrogen to produce a phosphonic acid rich surface. Particles—Ni—$S(CH_2)_4PO(OH)_2$, was cleaned with $H_2O$ using three centrifugation/redispersion cycles, the modified particles were ready for treatment in metal solution. While stirring ZrPV(Cl) films were grown on Particles—Ni—$S(CH_2)_4PO(OH)_2$ by alternate treatment in 1.5 mM Viologenbisphosphonic acid solution or at 60° C. for over night and room temperature treatment in 20 mM ZrOCl2 aqueous solution for 3 h . While stirring ZrANQ films were grown on Particles—Ni—$S(CH_2)_4PO(OH)_2$ by alternate treatment in 1.5 mM solution of 2,6-dihydoxyanthraquinone bisphosphonic acid derivative at 60° C. for over night and room temperature treatment in 20 mM ZrOCl2 aqueous solution for 3 h. The particles were thoroughly cleaned with $H_2O$ using three centrifugation/redispersion cycles between treatments.

Modification of Si—Pd with $Zr(NAP)_1(ANQ)_2$.

Pd-modified particles was initialized with (4-mercaptobutyl)phosphonic acid (1 mM solution in ethanol) over night under nitrogen to produce a phosphonic acid rich surface. Si—Pd—$S(CH_2)_4PO(OH)_2$, was cleaned with $H_2O$ using three centrifugation/redispersion cycles, the modified particles were ready for treatment in metal solution. While stirring $Zr(NAP)_1(ANQ)_2$ film were grown on Particles—Pd—$S(CH_2)_4PO(OH)_2$ by alternate treatment in 1.5 mM solution of 2,6-dihydroxynaphthalene bisphosphonic acid derivative at 60° C. for over night and room temperature treatment in 20 mM ZrOCl2 aqueous solution for 3 h followed by two alternate treatment of 1.5 mM solution of 2,6- dihydoxyanthraquinone bisphosphonic acid derivative at 60° C. for over night and room temperature treatment in 20 mM ZrOCl2 aqueous solution for 3 h . The $Zr(NAP)_1(ANQ)_2$-modified particles were thoroughly cleaned with $H_2O$ using three centrifugation/redispersion cycles between treatments.

Modification of Si—Pd with $Zr(PV)_1(ANQ)_2$

Pd-modified particles was initialized with (4-mercaptobutyl)phosphonic acid (1 mM solution in ethanol) over night under nitrogen to produce a phosphonic acid rich surface. Si—Pd—$S(CH_2)_4PO(OH)_2$, was cleaned with $H_2O$ using three centrifugation/redispersion cycles, the modified particles were ready for treatment in metal solution. While stirring $Zr(PV)_1(ANQ)_2$ film were grown on Particles—Pd—$S(CH2)_4PO(OH)2$ by alternate treatment in 1.5 mM solution of Viologenbisphosphonic acid derivative at 60° C. for over night and room temperature treatment in 20 mM ZrOCl2 aqueous solution for 3 h followed by two alternate treatment of 1.5 mM solution of 2,6-dihydoxyanthraquinone bisphosphonic acid derivative at 60° C. for over night and room temperature treatment in 20 mM ZrOCl2 aqueous solution for 3 h . The $Zr(PV)_1(ANQ)_2$-modified particles were thoroughly cleaned with $H_2O$ using three centrifugation/redispersion cycles between treatments.

Synthesis of ($H_2O_3P$—$(CH_2)_4O$—2,6-naphthalene—O $(CH_2)_4$—$PO_3H_2$)

Synthesis of 2,6Bis(4-phosphonobutyloxy)-naphthalene (NAP) (Formula: $H_2O_3P$—$(CH_2)_4O$—2,6-naphthalene—O $(CH_2)_4$—$PO_3H_2$). 1.34 g of KOH in ethanol were added dropwise to a mixture of 2,6-dihydroxynaphthalene (1.6g, 10 mmol) and diethyl(4-bromobutyl)phosphonate (6.0 g, 22 mmol) in ethanol, the mixture was left at room temperature for over night. The product was extracted with $CH_2Cl_2$. The $CH_2Cl_2$ solution was dried, leaving a brownish solid. The ester was purified by column chromatography. The bisphosphonate ester was converted to the acid by overnight stirring with 4-fold excess of bromotrimethylsilane in dry dichloromethane followed by addition of water. The bisphosphonic acid derivative was washed with $CH_2Cl_2$, filtered and collected.

TABLE 1

Elemental composition of the major elements in the catalysts used. The data was measured by ICP-MS, at the Keck Engineering Center, California Institute of Technology.

| S.No | Catalyst | Zr/Hf, mmol/g | | Pd, mmol/g | Pt, mmol/g | Pt/(Pd + Pt), % in the calatyst |
|---|---|---|---|---|---|---|
| 1. | SCRI124 | 1.38 | (Zr) | 0.293 | 0.031 | 9.57 |
| 2. | SCRI130 | 1.23 | (Zr) | 0.316 | 0.049 | 13.20 |
| 3. | Zr2riPt7 | 2.03 | (Zr) | 0.247 | 0.019 | 7.14 |
| 4. | Zr3riPt7 | 1.41 | (Zr) | 1.346 | 0.060 | 4.27 |
| 8. | Hf19hiPt50 | 1.99 | (Hf) | 0.800 | 0.297 | 27.05 |
| 9. | Hf20hiPt10 | 1.79 | (Hf) | 0.860 | 0.077 | 8.24 |
| 10. | Hf20hiPt30 | 1.90 | (Hf) | 0.850 | 0.185 | 17.90 |
| 11. | Hf20hiPt70 | 1.88 | (Hf) | 0.552 | 0.336 | 37.80 |
| 12. | Hf20hiPt | 1.74 | (Hf) | 0.000 | 0.342 | 100.00 |
| 13. | Hf20hiPd | 1.72 | (Hf) | 1.077 | 0.000 | 0.00 |
| 14. | FASiKPtPV2 | — | (Zr) | 0.000 | 0.236 | 100.00 |
| 15. | FASiIPdPV3 | — | (Zr) | | 0.000 | 0.00 |
| 16. | FASiIPdANQ3 | — | (Zr) | 0.278 | 0.000 | 0.00 |

TABLE 2

Near equilibrium concentrations of $H_2O_2$ produced in the batch reactor after several hours of reaction by bubbling $H_2$ and $O_2$ in a slurry of suspended catalyst in aqueous dilute $H_2SO_4$ or HCl

| Catalyst (reduced) | $[H_2O_2]$, mM | Time, hr | Maximum rate, mmol/min. g of the catalyst. | Medium |
|---|---|---|---|---|
| SCRI124 | 42 | 4 | 0.24 | $H_2SO_4$ |
| " | 34 | 5 | 0.14 | HCl |
| SCRI130 | 66 | 5 | 0.36 | $H_2SO_4$ |
| " | 65 | 7 | 0.28 | HCl |
| Hf20hiPdr | 205 | 7 | 0.70 | HCl |
| Hf19hiPt50r | 60 | 6 | 0.30 | HCl |

TABLE 3

Near equilibrium concentrations of $H_2O_2$ produced in the batch reactor after several hours of reaction by bubbling $H_2$ and $O_2$ in a slurry of suspended catalyst in a mixture of acetone and dilute $H_2SO_4$.

| Catalyst (reduced) | $[H_2O_2]$, mM | Time, hr | Maximum rate, mmol/min g of catalyst |
|---|---|---|---|
| SCRI124 | 63 | 7 | 0.23 |
| SCRI130 | 90 | 5 | 0.44 |
| Zr2riPt7r | 174 | 6 | 0.80 |
| Zr3riPt7r | 175 | 5 | 0.90 |
| Hf20hiPdr | 343 | 7 | 1.30 |
| Hf20hiPt10r | 240 | 7 | 1.12 |
| Hf20hiPt30r | 160 | 7 | 0.60 |
| Hf19hiPt50r | 110 | 5 | 0.80 |
| Hf20hiPt70r | 60 | 7 | 0.25 |
| Hf20hiPtr | <10 | >5 | <0.05 |
| FASiIPdPV3 | 150 | 8 | 0.60 |
| FASiIPdANQ3 | 13 | 7 | 0.30 |
| FASiKPtPV2* | 57 | 6 | 0.62 |

*Denotes that 20 mg of this catalyst was used for kinetics.

We claim:

1. A method for the production of hydrogen peroxide by contacting a dispersion of a catalyst in an organic reaction medium with a source of hydrogen and oxygen wherein said catalyst consists essentially of inert particles of between about 1 to 100 microns and which have coated on the surface a Group VIII metal and coated on the Group VIII metal is about three to about ten layers of a complex having the formula:

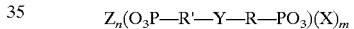

wherein Z is zirconium or hafnium, each of R and R' is lower alkyl, X is halogen, Y is an aromatic ring system, n is a number from 1 to 3 and m is a number of from 1 to 10, wherein said layers of complex allow only hydrogen to diffuse through and contact the Group VIII metal, and wherein said organic reaction medium has a pH of less than about 3 and consists essentially of (a) at least about 50 percent by volume of an organic liquid selected from the group consisting of lower alkyl alcohol, lower alkyl ketone and a mixture of lower alkyl alcohol and lower all ketone, (b) water and (c) a mineral acid.

2. A method according to claim 1 wherein said lower alkyl alcohol is selected from the group consisting of methanol, ethanol and isopropanol.

3. A method according to claim 1 wherein the lower alkyl ketone is acetone.

4. A method according to claim 1 wherein the amount of organic liquid is from about 60 percent by volume to 80 percent by volume.

5. A method according to claim 1 wherein the pH of said organic reaction medium is less than about 2.

6. A method according to claim 5 wherein the mineral acid is hydrochloric acid.

7. A method according to claim 5 wherein the mineral acid is sulfuric acid.

8. A method according to claim 1 wherein the Group VIII metal is palladium, platinum or nickel.

9. A method according to claim 1 wherein Y is anthraquinone.

10. A catalyst for catalyzing the reaction between hydrogen and oxygen to produce hydrogen peroxide, said catalyst consisting essentially of inert particles of between about 1 to 100 microns and which have coated on the surface a Group VIII metal and coated on the Group VIII metal is about three to about ten layers of a complex having the formula:

$$Z_n(O_3P-R'-Y-R-PO_3)(X)_m$$

wherein Z is zirconium or hafnium, each of R and R' is lower alkyl, X is halogen, Y is an aromatic ring system, n is a number from 1 to 3 and m is a number of from 1 to 10, wherein said layers of complex allow only hydrogen to diffuse through and contact the Group VIII metal.

11. A catalyst according to claim 10 wherein the Group VIII metal is platinum, palladium, nickel or mixtures thereof.

12. A catalyst according to claim 10 wherein X is chlorine or bromine.

13. A catalyst according to claim 10 wherein Y is anthraquinone.

* * * * *